United States Patent
Moustafa et al.

(10) Patent No.: US 11,345,807 B2
(45) Date of Patent: May 31, 2022

(54) SYNTHESIS OF RE-PULPABLE TEMPORARY WET STRENGTH POLYMER FOR TISSUE APPLICATION

(71) Applicant: Buckman Laboratories International, Inc., Memphis, TN (US)

(72) Inventors: Ahmed Moustafa, Germantown, TN (US); Daniel Glover, Brighton, TN (US)

(73) Assignee: BUCKMAN LABORATORIES INTERNATIONAL, INC., Memphis, TN (US)

( * ) Notice: Subject to any disclaimer, the term of this patent is extended or adjusted under 35 U.S.C. 154(b) by 205 days.

(21) Appl. No.: 16/668,297

(22) Filed: Oct. 30, 2019

(65) Prior Publication Data

US 2020/0140671 A1    May 7, 2020

Related U.S. Application Data

(60) Provisional application No. 62/754,598, filed on Nov. 2, 2018.

(51) Int. Cl.
| | | |
|---|---|---|
| C08L 51/00 | (2006.01) | |
| D21H 13/02 | (2006.01) | |
| D21H 17/36 | (2006.01) | |
| D21H 19/20 | (2006.01) | |

(52) U.S. Cl.
CPC ............ *C08L 51/003* (2013.01); *D21H 13/02* (2013.01); *D21H 17/36* (2013.01); *D21H 19/20* (2013.01); *C08L 2201/54* (2013.01)

(58) Field of Classification Search
CPC ... C08L 51/003; C08L 2201/54; D21H 19/20; D21H 17/36; D21H 13/02
USPC ........................................................ 524/504
See application file for complete search history.

(56) References Cited

U.S. PATENT DOCUMENTS

| | | |
|---|---|---|
| 3,017,291 A | 1/1962 | McLaughlin et al. |
| 3,410,828 A | 11/1968 | Kekish |
| 3,856,734 A | 12/1974 | Iacoviello |
| 4,012,352 A | 3/1977 | Deyrup |
| 4,118,357 A | 10/1978 | Brabetz et al. |
| 4,158,594 A | 6/1979 | Becker et al. |
| 4,339,552 A | 7/1982 | Lindemann |
| 4,420,368 A | 12/1983 | Drach |
| 4,431,250 A | 2/1984 | Prusow |
| 4,481,250 A | 11/1984 | Cook et al. |
| 4,575,532 A | 3/1986 | Schmukler et al. |
| 4,581,394 A * | 4/1986 | Yoshida ............... B41M 5/44 428/511 |
| 5,147,908 A | 9/1992 | Floyd et al. |
| 5,354,803 A | 10/1994 | Dragner et al. |
| 5,397,436 A | 3/1995 | Robeson et al. |
| 5,543,446 A | 8/1996 | Rodriguez |
| 5,723,022 A | 3/1998 | Dauplaise et al. |
| 6,060,566 A | 5/2000 | Denzinger et al. |
| 6,132,803 A | 10/2000 | Kelly et al. |
| 6,235,835 B1 | 5/2001 | Niessner et al. |
| 6,274,667 B1 | 8/2001 | Shannon et al. |
| 6,332,952 B1 | 12/2001 | Hsu et al. |
| 6,334,931 B1 | 1/2002 | Dwiggins et al. |
| 6,395,817 B2 | 5/2002 | Rabasco et al. |
| 6,881,778 B2 | 4/2005 | Triantafillopoulos et al. |
| 7,488,403 B2 | 2/2009 | Hagiopol et al. |
| 7,598,331 B2 | 10/2009 | Barcus et al. |
| 7,608,665 B2 | 10/2009 | Proverb et al. |
| 7,897,013 B2 | 3/2011 | Hagiopol et al. |
| 8,466,216 B2 | 6/2013 | Goulet et al. |
| 8,614,279 B2 | 12/2013 | Gu et al. |
| 2004/0112558 A1 | 6/2004 | Garnier et al. |

FOREIGN PATENT DOCUMENTS

| | | | |
|---|---|---|---|
| CN | 104119480 A | * | 10/2014 |
| CN | 104119480 B | | 5/2017 |
| EP | 0144155 A2 | | 6/1985 |
| EP | 1242466 B1 | | 1/2004 |
| JP | 08246388 | * | 9/1996 |
| JP | H08246388 A | | 9/1996 |
| JP | 2001207395 A | | 8/2001 |
| JP | 2001514552 A | | 9/2001 |
| WO | 0174599 A1 | | 10/2001 |
| WO | WO-0174599 | * | 10/2001 ............ C08L 51/003 |

OTHER PUBLICATIONS

International Search Report and Written Opinion issued in corresponding International Patent Application No. PCT/US2019/058728 dated Feb. 11, 2020 (13 pages).

Chiang et al., "Studies of Reactions with Polymers, IV* Syntheses and Properties of Poly(vinyl alcohol) Graft Terpolymers Containing Imide Side Chains," Die Angewandte Makromolekulare Chemie, 1989, vol. 165, pp. 133-152.

Tselios et al., "Structure and Properties of Blends of Poly(ethylene-co-vinyl alcohol) with Poly(styrene-co-maleic anhydride)," Journal of Applied Polymer Science, 1996, pp. 983-999.

Chiang et al., "Studies of Reactions with Polymers. II. The Reaction of Maleic Anhydride with Acrylonitrile onto PVA and the Properties of the Resultant," Journal of Applied Polymer Science, 1985, vol. 30, pp. 4045-4056.

Lindstrom, et al., "On the nature of joint strength in paper—A review of dry and wet strength resins in paper manufacturing," STFI-Packforsk, 2005, (132 pages).

(Continued)

*Primary Examiner* — Hui H Chin
(74) *Attorney, Agent, or Firm* — Kilyk & Bowersox, P.L.L.C.

(57) ABSTRACT

A grafted polyvinyl alcohol polymer has a balance between hydrophilicity and hydrophobicity. The grafted polyvinyl alcohol polymer has a chemical functionality that allows for adsorption onto the pulp fibers, polymer film formation upon drying, repelling water upon wetting, polymer film swelling and breaking for prolonged wetting by water. When incorporated into paper products, the polymer can provide a paper having improved wet strength, temporary water repellency, and/or is dispersible in aqueous solutions.

30 Claims, 4 Drawing Sheets

(56) References Cited

OTHER PUBLICATIONS

Alince, "Cationic latex as a multifunctional papermaking wet-end additive," Tappi Journal, 1999, vol. 82, No. 1, pp. 175-187.
Alince et al., "Latex-Fiber Interaction and Paper Reinforcement," Journal of Applied Polymer Science, 1976, vol. 20, pp. 2209-2219.
Alince, "Cationic Latex in Fiber-Clay Paper Composites" Journal of Polymer Science, 1982, vol. 20, pp. 615-620.
Alince, "Performance of cationic latex as a wet-end additive," Tappi Journal, 1977, vol. 60, No. 12, pp. 133-136.
Alince, "Increasing tensile strength without losing opacity," Tappi Journal, 1991, pp. 221-223.
Alince et al., "Cationic Latex: Colloidal Behavior and Interaction with Anionic Pulp Fibers," Journal of Applied Polymer Science, 2000, vol. 76, pp. 1677-1682.
Lindstrom, et al., "On the nature of joint strength of paper—Effect of dry strength agents—Revisiting the Page equation," Nordic Pulp & Paper Research Journal, 2016, vol. 31, No. 3, pp. 459-468.
Alince, "Effect of heat on paper reinforcement by styrene-butadiene latex," Pulp and Paper Research, 1977, pp. 417-421.

\* cited by examiner

US 11,345,807 B2

SYNTHESIS OF RE-PULPABLE TEMPORARY WET STRENGTH POLYMER FOR TISSUE APPLICATION

This application claims the benefit under 35 U.S.C. § 119(e) of prior U.S. Provisional Patent Application No. 62/754,598, filed Nov. 2, 2018, which is incorporated in its entirety by reference herein.

BACKGROUND OF THE INVENTION

The present invention relates to a grafted polyvinyl alcohol polymer, compositions containing the grafted polyvinyl alcohol polymer, and their use for paper-making, and products thereof.

Papermaking generally includes forming an aqueous pulp composition, then sheeting and drying the pulp to form a desired paper product. If the paper product is to be used in a wet application, for instance as a paper towel or tissue paper, a good wet strength is often desired. However, if the wet strength is too strong, the paper may not disperse when immersed in water, causing sewage lines to become clogged.

Failure to disperse in water also makes it difficult to recycle paper. Office paper, for instance, is often recycled. When recycled, the paper must be re-pulped, which generally entails dispersion of the paper in an aqueous solution. However, in order to be used with printers, office paper requires the ability to repel water. Otherwise, the ink placed on the paper by the printer would bleed, diminishing the quality of the printed document or image.

Various additives have been employed to improve the wet strength and water repellency of paper. Generally, these additives are polymers attached to paper fibers via covalent bonds. While such polymers can improve wet strength or water repellency, they lead to problems when the paper is recycled. When re-pulped, the moieties within the additives, providing covalent attachment to the paper fibers, leave hydrophilic, tacky polymeric residues that re-agglomerate in various parts of the paper mill. These agglomerates, known as stickies, can clog various elements of a paper mill.

Accordingly, a need exists for an additive that produces an easily water-dispersible paper, while also improving wet strength of the paper, providing the paper with temporary water repellency and/or providing the paper with water absorption delay properties.

SUMMARY OF THE PRESENT INVENTION

A feature of the present invention is to provide a novel, non-reactive grafted polyvinyl alcohol polymer that is a fine-tuned balance between hydrophilicity and hydrophobicity.

Another feature of the present invention is to provide a resin that is water dispersible and easily adsorbed onto cellulosic substrates, but has temporary water repelling and/or water absorption delay properties.

A further feature of the present invention is to provide a blotter paper and/or tissue paper that will temporarily absorb much less water when treated with a polymer and/or resin containing the polymer.

An additional feature of the present invention is to provide a tissue paper, wherein prolonged immersion of treated tissue paper in water does not prevent water from breaking down the fiber-fiber entanglement, thereby allowing complete dispersion of tissue paper in water.

Another feature of the present invention is to provide a polymer that imparts dry tensile strength and/or wet tensile strength to tissue paper, but allows good water dispersibility in sewage lines.

An additional feature of the present invention is to provide a polymer that does not prevent re-pulping and/or recycling of paper as it can be slowly plasticized and then washed out or re-dispersed by water over a few minutes from the initial dispersion.

Another feature of the present invention is to provide a novel grafted polyvinyl alcohol polymer that is a reaction product of a polyvinyl alcohol having a relatively low degree of hydrolysis and vinylic, cationic monomers.

Additional features and advantages of the present invention will be set forth in part in the description that follows, and in part will be apparent from the description, or can be learned by practice of the present invention. The objectives and other advantages of the present invention will be realized and attained by means of the elements and combinations particularly pointed out in the description and appended claims.

One or more of the foregoing features have been accomplished in accordance with this invention by providing a grafted polyvinyl alcohol polymer of the present invention. The grafted polyvinyl alcohol polymer has or includes a polyvinyl alcohol main chain and a plurality of side chains grafted to the polyvinyl alcohol main chain. One or more of said side chains from the plurality of side chains includes: i) one or more units selected from: an aliphatic monocarboxylic acid, an aliphatic dicarboxylic acid, and/or a reactive quaternary ammonium salt; and, optionally, ii) units of an aliphatic amide, or a branched alkyl acrylate, or any combinations thereof.

The present invention further relates to a polymer composition including the grafted polyvinyl alcohol polymer and an aqueous medium in which the grafted polyvinyl alcohol polymer is dispersed.

The present invention further relates to an aqueous-based emulsion polymer including the grafted polyvinyl alcohol polymer.

The present invention further relates to a cellulosic pulp product including cellulosic pulp and the grafted polyvinyl alcohol polymer.

The present invention further relates to a paper product including a paper material and the grafted polyvinyl alcohol polymer.

The present invention further relates to a product including at least one paper layer containing the grafted polyvinyl alcohol polymer. The product is paper sheeting, paperboard, tissue paper and/or wallboard.

The present invention further relates to a fibrous material including cotton fibers and the grafted polyvinyl alcohol polymer.

The present invention further relates to a process of making paper, which includes a step of absorbing or otherwise treating with an amount of the grafted polyvinyl alcohol polymer on cellulosic papermaking fibers in an aqueous suspension. The process can further include a step of forming the aqueous suspension into a web and drying the web. In the process, the amount of the grafted polyvinyl alcohol polymer is effective to increase paper wet strength and/or paper dry strength and/or water dispersibility as compared to a paper made with the aqueous suspension absent the grafted polyvinyl alcohol polymer.

The present invention further relates to a process for making a grafted polyvinyl alcohol polymer, the process including steps of providing an aqueous solution of a polyvinyl alcohol polymer, and adding, to the aqueous solution, at least one free-radical forming initiator and a plurality of monomers that form the side chain(s), referred to as "side chain monomers". In the process, the plurality of side chain monomers includes: (a) an aliphatic monocarboxylic acid, and/or an aliphatic dicarboxylic acid, and/or a reactive quaternary ammonium salt, or any combination thereof; (b) optionally an aliphatic amide; and (c) optionally a branched alkyl acrylate.

The present invention further relates to a process for re-pulping paper, the process including a step of contacting a paper product with an alkali metal ion-containing caustic aqueous solution. Upon this contacting, carboxylic functionalities in the grafted polyvinyl alcohol polymer according to the present invention are converted to alkali metal carboxylate functionalities. In this process, the paper product includes a paper material and the grafted polyvinyl alcohol polymer of the present invention.

The present invention further relates to a polymer mixture, which includes a first grafted polyvinyl alcohol polymer including a first polyvinyl alcohol main chain and a first plurality of side chains grafted to the first polyvinyl alcohol main chain. The side chains from the first plurality of side chains include: i) one or more units selected from: an aliphatic monocarboxylic acid and/or an aliphatic dicarboxylic acid; and, optionally, ii) an aliphatic amide, or a branched alkyl acrylate, or any combinations thereof. The polymer mixture also includes a second grafted polyvinyl alcohol polymer including a second polyvinyl alcohol main chain and a second plurality of side chains grafted to the second polyvinyl alcohol main chain. The side chains from the second plurality of side chains include: i) one or more units of a reactive quaternary ammonium salt; and, optionally, ii) an aliphatic amide, or a branched alkyl acrylate, or any combinations thereof.

It is to be understood that both the foregoing general description and the following detailed description are exemplary and explanatory only and intended to provide a further explanation of the present invention, as claimed.

DETAILED DESCRIPTION OF THE PRESENT INVENTION

Figure 1:
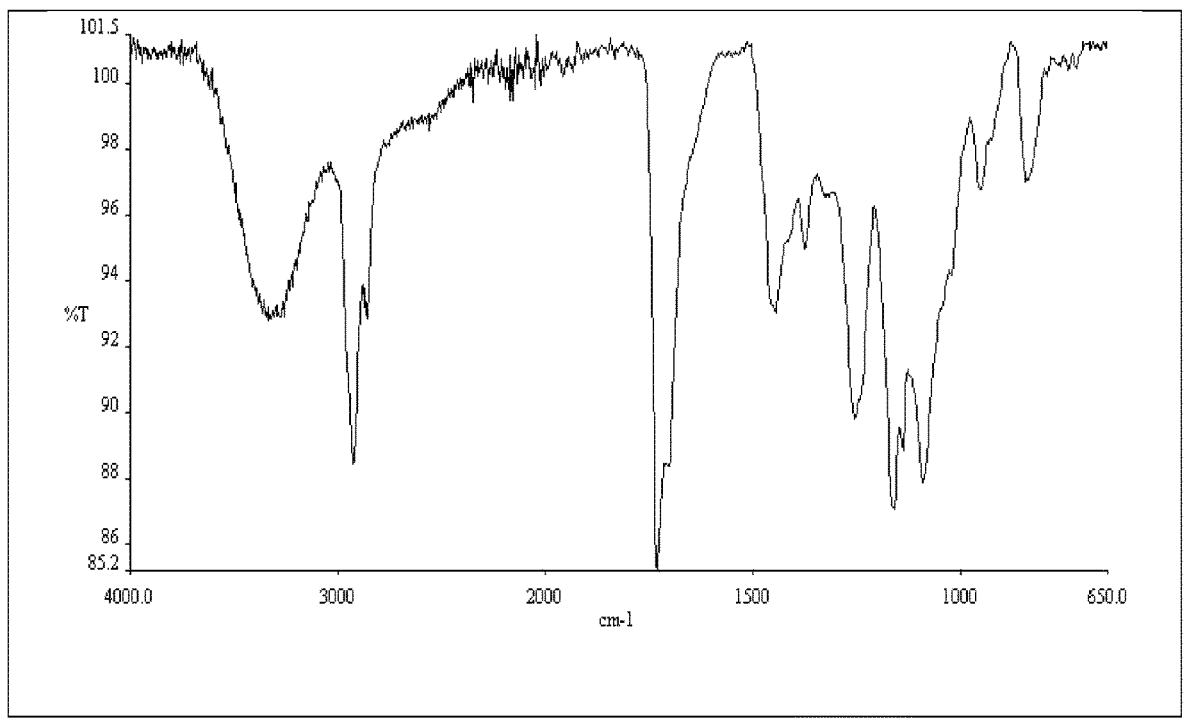
FIG. 1 shows a Fourier-transform infrared spectroscopy of one embodiment of the grafted polyvinyl alcohol polymer of the present invention.
Figure 2:
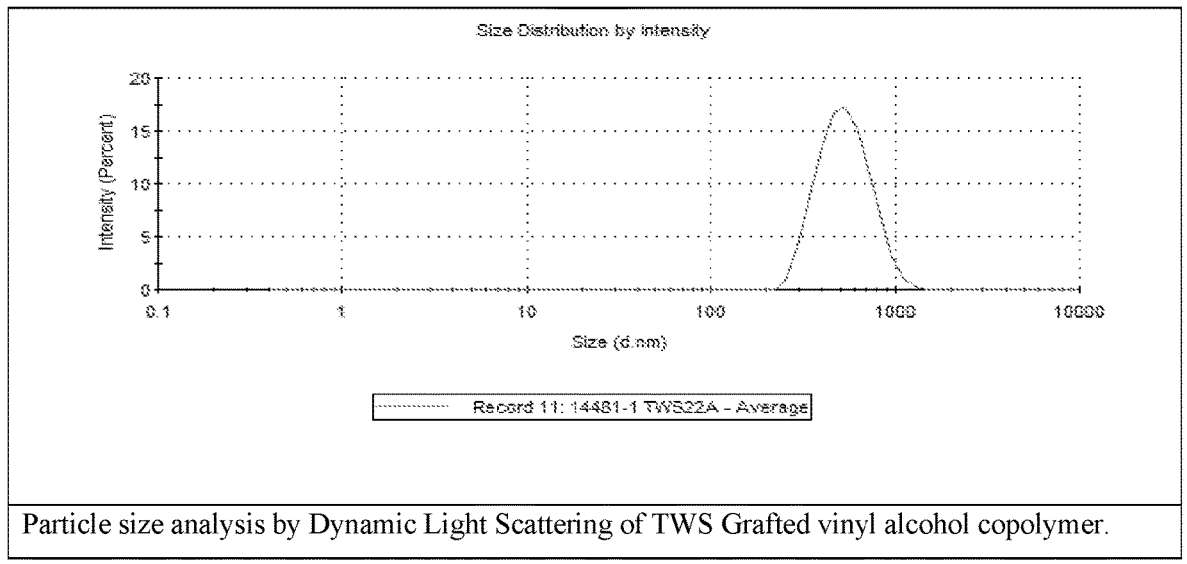
FIG. 2 shows the particle size analysis of one embodiment of the grafted polyvinyl alcohol of the present invention by dynamic light scattering.
Figure 3:
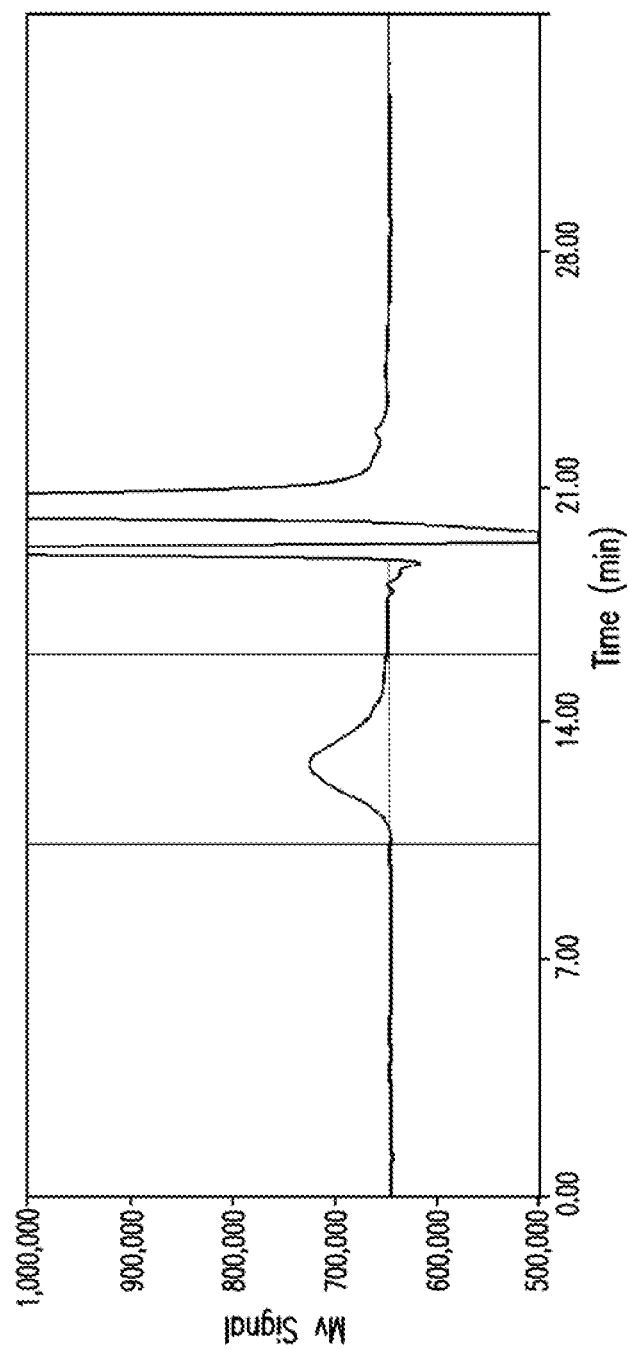
FIG. 3 shows the molecular weight distribution by gel permeation chromatography of one embodiment of the grafted polyvinyl alcohol polymer of the present invention.

The present invention relates to a grafted polyvinyl alcohol polymer that is water dispersible and easily adsorbed onto cellulosic substrates but has temporary water repelling and/or water absorption delay properties. Paper products incorporating the grafted polyvinyl alcohol polymer can have temporary wet strength and be re-pulpable, enabling recycling, and/or dispersion in sewage lines.

The grafted polyvinyl alcohol polymer of the present invention comprises or includes a polyvinyl alcohol main chain having a plurality of vinyl alcohol and vinyl acetate repeating units linked together. This main chain thus has a plurality of acetate and hydroxyl moieties pendent to a carbon backbone of the polyvinyl alcohol main chain. The structure of the polyvinyl alcohol main chain provides acetate and hydroxyl moieties when the polyvinyl alcohol main chain is in unreacted form, and can then be reacted with monomers to form the grafted polyvinyl alcohol polymer of the present invention. As an option, alkylene repeating units can be present in the main chain, and thus the polyvinyl alcohol main chain can be described as a poly (alkylene-co-vinyl alcohol-co-vinyl acetate) polymer. Accordingly, the polyvinyl alcohol main chain can be considered, called, or termed a polymer, a copolymer, or a terpolymer.

The polyvinyl alcohol main chain, in free, unreacted form, can have a degree of hydrolysis of from about 74 mol % to about 99 mol % or other amounts below or above this range. All values between 74 mol % and 99 wt % are included in this range, with the end points included, and thus the range can be from 74 mol % to 95 mol %, from 74 mol % to 90 mol %, from 74 mol % to 88 mol %, from 76 mol % to 95 mol %, from 76 mol % to 90 mol %, and from 76 mol % to 88 mol %. Since all values between 74 mol % and 99 wt % are included in this range, the degree of hydrolysis can be 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, and 98 mol %, with decimals and fractions thereof included. As used herein, the word "about" refers to a degree of hydrolysis of ±1 mol % of the recited value for the degree of hydrolysis.

In one preferred aspect, the polyvinyl alcohol main chain, in free, unreacted form, has a degree of hydrolysis of from about 74 mol % to about 88 mol %, and this polyvinyl alcohol main chain, in free, unreacted form, reacts with at least one monomer that comprises the reactive quaternary ammonium salt.

The degree of hydrolysis can be an indicator as to how many free, pendent hydroxyl moieties (—OH) are present on the main chain of the polyvinyl alcohol main chain. The synthesis of polyvinyl alcohol first involves the polymerization of vinyl acetate, which forms polyvinyl acetate. Thereafter, acetate moieties (—O—(CO)—CH$_3$) are replaced with alcohol moieties via a hydrolysis reaction to form the free, pendent hydroxyl moieties. Thus, as used herein, the "degree of hydrolysis" can refer to the mol % of acetate moieties that are replaced with alcohol moieties upon transesterification of the polyvinyl acetate. Thus, as an example, 74 mol % of acetate moieties are replaced with alcohol moieties for a polyvinyl alcohol main chain characterized by a degree of hydrolysis of 74 mol %.

In an aspect of the present invention, the polyvinyl alcohol main chain, in unreacted form, can have a number-average molecular weight of from about 1,000 Daltons to about 50,000 Daltons. The weight-average molecular weight of the polyvinyl alcohol main chain, in unreacted form, can be from 10,000 Daltons to 200,000 Daltons.

The polyvinyl alcohol main chain, in unreacted form, can have a polydispersity, Mw/Mn, of from 1.1 to 10, such as from 2 to 7.

The monomodal molecular weight distribution of the polyvinyl alcohol main chain, in unreacted form, can be from 5 K to 500K Daltons, such as 50 K to 500 K Daltons. The monomodal molecular weight distribution can have a mean of about 219K Daltons±50,000 daltons, such as about 219K Daltons±10,000 daltons.

The free, unreacted polyvinyl alcohol that forms the main chain of the grafted polyvinyl alcohol polymer can be referred to herein as a "PVOH."

The polyvinyl alcohol main chain, in unreacted form, can be one or more of POVAL™ (Kuraray Co., Ltd.) 5/88, 3/80 3/82, 3/85, 4/85, 4/88, 5/82, 6/88, 13/88, 3/88, 5/74, 5/88, 8/88, and RS2117, one or more of SELVOL™ (Sekisui Specialty Chemicals America, LLC) 502, 513, 518, 418, 425, 443, 203, 523, 205, and 540, and any combination thereof.

Upon reaction of the polyvinyl alcohol main chain and monomers, a plurality of side chains is grafted to one or more of the pluralities of repeating units of the polyvinyl alcohol main chain at, via, or through, the acetate moieties and/or hydroxyl moieties thereof. The monomers can be: i) one or more monomers selected from: an aliphatic monocarboxylic acid, and/or an aliphatic dicarboxylic acid, and/or a reactive quaternary ammonium salt; and, optionally, ii) an aliphatic amide, or a branched alkyl acrylate, or any combinations thereof. Without wishing to be bound to a particular theory, or to a particular chemical reaction mechanism, all or part of the acetate and/or hydroxyl moieties can be replaced with monomers during the grafting reactions.

The plurality of side chains comprises, consists essentially of, consists of, includes, or is, side chains that comprise: i) one or more units selected from: an aliphatic monocarboxylic acid, an aliphatic dicarboxylic acid, and/or a reactive quaternary ammonium salt; and, optionally, ii) units of an aliphatic amide, or of a branched alkyl acrylate, or any combinations thereof. Accordingly, the monomers that react with the polyvinyl alcohol are selected from an aliphatic monocarboxylic acid, an aliphatic dicarboxylic acid, a reactive quaternary ammonium salt, an aliphatic amide, and/or a branched alkyl acrylate. Any combination of these monomers can be included in the reaction with the polyvinyl alcohol that forms the polyvinyl alcohol main chain.

In the grafted polyvinyl alcohol polymer of the present invention, at least 75%, by number, of the side chains from the plurality of side chains can comprise: i) one or more units selected from: the aliphatic monocarboxylic acid, the aliphatic dicarboxylic acid, and/or the reactive quaternary ammonium salt; and, optionally, ii) units of the aliphatic amide, or of the branched alkyl acrylate, or any combinations thereof. Further, not more than 25%, by number, of side chains from the plurality of side chains can comprise units of the aliphatic amide, or units of the branched alkyl acrylate, or any combinations thereof, and have no units of the aliphatic monocarboxylic acid, or of the aliphatic dicarboxylic acid, and/or of the reactive quaternary ammonium salt.

Alternatively, one or more of the side chains from the plurality of side chains can comprise units of the aliphatic amide, or units of the branched alkyl acrylate, or any combinations thereof.

In a grafted polyvinyl alcohol polymer of the present invention, side chains from the plurality of side chains can comprise: i) units of the reactive quaternary ammonium salt; and, optionally, ii) units of the aliphatic amide, or units of the branched alkyl acrylate, or any combinations thereof. In this aspect, side chains of the grafted polyvinyl alcohol polymer do not need, or have, units of an aliphatic monocarboxylic acid and/or units of an aliphatic dicarboxylic acid. In one aspect of the present invention, at least 75%, by number, of the side chains from the plurality of side chains can comprise: i) units of the reactive quaternary ammonium salt; and, optionally, ii) units of the aliphatic amide, or units of the branched alkyl acrylate, or any combinations thereof. Further, not more than 25%, by number, of side chains from the plurality of side chains can comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

In another aspect of the present invention, at least 75%, by number, of the side chains from the plurality of side chains can comprise: i) units of the quaternary ammonium salt; and, optionally, ii) units of the aliphatic amide, or units of the branched alkyl acrylate, or any combinations thereof, and do not have any units of the aliphatic monocarboxylic acid and of the aliphatic dicarboxylic acid. Not more than 25%, by number, of side chains from the plurality of side chains can comprise units of the aliphatic amide, or units of the branched alkyl acrylate, or any combinations thereof, and have no units the aliphatic monocarboxylic acid, the aliphatic dicarboxylic acid, and the reactive quaternary ammonium salt.

Another aspect of the present invention relates to a grafted polyvinyl alcohol polymer where one or more of said side chains from the plurality of side chains comprise units of the aliphatic amide, or units of the branched alkyl acrylate, or any combinations thereof.

Another aspect of the present invention relates to a grafted polyvinyl alcohol polymer where side chains from the plurality of side chains comprise: i) one or more units selected from: the aliphatic monocarboxylic acid and the aliphatic dicarboxylic acid; and, optionally, ii) units of the aliphatic amide, or units of the branched alkyl acrylate, or any combinations thereof. At least 75% of the side chains from the plurality of side chains can comprise: i) one or more units selected from: the aliphatic monocarboxylic acid and the aliphatic dicarboxylic acid; and, optionally, ii) units of the aliphatic amide, or units of the branched alkyl acrylate, or any combinations thereof. Further, not more than 25%, by number, of side chains from the plurality of side chains can comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

Another aspect of the present invention relates to a grafted polyvinyl alcohol polymer where at least 75%, by number, of the side chains from the plurality of side chains can comprise: i) one or more units selected from: the aliphatic monocarboxylic acid and the aliphatic dicarboxylic acid;

and, optionally, ii) units of the aliphatic amide, or units of the branched alkyl acrylate, or any combinations thereof, and do not have any units of the reactive quaternary ammonium salt. Not more than 25%, by number, of side chains from the plurality of side chains comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

Another aspect of the present invention relates to a grafted polyvinyl alcohol polymer where one or more of said side chains from the plurality of side chains comprise the aliphatic amide, or the branched alkyl acrylate, or any combinations thereof.

When units of the quaternary ammonium salt are present in side chains of the grafted polyvinyl alcohol polymer, these side chains can be called "cationic side chains." These side chains can contribute towards fast adsorption of the grafted polyvinyl alcohol polymer onto cellulose fibers and re-pulpability. Some side chains of the grafted polyvinyl alcohol polymer do not need to have units of the reactive quaternary ammonium salt. The fast adsorption onto cellulose fibers can still take place when, e.g. at least 75%, by number, of the side chains of the grafted polyvinyl alcohol comprise or include units of reactive quaternary ammonium salt.

In another aspect of the present invention, side chains of the grafted polyvinyl alcohol polymer can have units of a carboxylic acid. When a paper product comprising a grafted polyvinyl alcohol polymer having side chains comprising units of a carboxylic acid is washed by water, the embodiment swells slowly then break or re-disperse, in, thereby converting a resin of the polymer from a solid state to a water dispersible polymer regardless of the exact metal ions within the solution and the exact carboxylate moieties provided. The carboxylate moieties can be anionic-to-negatively-charge moieties on the paper fibers.

The units of the carboxylic acid in the side chains of a grafted polyvinyl alcohol polymer can contribute towards re-pulpability. When a paper product comprising the grafted polyvinyl alcohol polymer having side chains comprising units of the carboxylic acid is washed in a caustic solution, carboxylic acid moieties can be converted to carboxylate moieties, thereby converting a resin of the grafted polyvinyl alcohol polymer from a solid state to a water dispersible polymer. For instance, the carboxylic moieties can be converted to carboxylate moieties by contacting a paper product containing the polymer with a metal ion-containing caustic aqueous solution. Further, if sodium ions are included within the metal ion-containing caustic aqueous solution, then a portion of the carboxylic moieties can be converted to sodium carboxylate moieties. Regardless of the exact metal ions within the solution and the exact carboxylate moieties provided, the carboxylate moieties can be anionic-to-negatively-charged moieties on the paper fibers. The carboxylate moieties of the grafted polyvinyl alcohol polymer can become anionic with carboxylate moieties on cellulosic fibers within the paper. With the presence of anionic-to-negatively-charged moieties on the paper fibers, the grafted polyvinyl alcohol polymer of the present invention and paper fibers can repel each other, thereby increasing water dispersibility.

Carboxylic moieties contributing towards water dispersibility in caustic and/or non-caustic solutions can be provided by carboxylic acid side chains. The carboxylic acid of these side chains can be, but are not limited to, acrylic acid, methacrylic acid, acrylates, methacrylates, itaconic acid, methylene succinic acid, or any combinations thereof.

The hydrophilic nature of hydroxylic and amide moieties within a grafted polyvinyl alcohol polymer can also increase dispersion of paper products in non-caustic solutions. When a paper comprising the grafted polyvinyl alcohol polymer is dispersed in water, the hydroxylic and amide moieties can swell in water, causing the paper to lose mechanical strength after a short period of time. The mechanical strength, and loss thereof, can also depend on the sheet thickness.

Hydroxylic moieties contributing towards water dispersibility in caustic and/or non-caustic solutions can be provided by polyvinyl alcohol chains. For example, free, pendent hydroxyl moieties of the polyvinyl alcohol main chain, still present after reaction with the main chain and the monomers, can contribute toward this water dispersibility.

Units of an amide within side chains of the grafted polyvinyl alcohol polymer can contribute towards water dispersibility. When dispersed in water, the amide moieties can swell in water, causing the paper to lose mechanical strength.

Units of the amide within side chains of the grafted polyvinyl alcohol polymer can contribute to the dry and/or wet strength of the paper. When the pH of an aqueous solution of the grafted polyvinyl alcohol polymer is sufficiently acidic, amine moieties of the amide moieties can be converted into a protonated cationic form, sensitive to negatively charged moieties within the paper fibers. As such, protonated amide moieties in the grafted polyvinyl alcohol polymer can electrostatically attract the polymer to paper fibers, thereby increasing the wet and/or dry strength. For instance, protonated amide moieties can be electrostatically attracted to carboxylic moieties within cellulosic fibers. Regardless of the negatively charged moieties within the paper fibers, a sufficient amount of protonated amide moieties to bind the grafted polyvinyl alcohol polymer to the paper fibers can be provided when the pH of the aqueous solution comprising the grafted polyvinyl alcohol polymer, and/or a resin incorporating the polymer, is from about 3 to about 6, preferably from about 4 to about 5.

Units of the amide within side chains of the grafted polyvinyl alcohol polymer can be provided by an aliphatic amide, such as, but not limited to, acrylamide, methacrylamide, dimethyl acrylamide, diethyl acrylamide, dipropyl acrylamide, or N-t-butylacrylamide or any combinations thereof.

While amide, hydroxyl, and/or quaternary ammonium salt moieties within the grafted polyvinyl alcohol polymer can contribute towards water dispersity, a temporary water barrier can be provided by polyethylene moieties grafted to the polyvinyl alcohol main chain. The temporary water barrier provided by alkyl moieties can decrease the water absorption rate of the paper, thereby increasing wet strength.

Alkyl moieties having a low glass transition temperature and/or surface tension can improve the temporary water barrier provided by the grafted polyvinyl alcohol polymer of the present invention. Alkyl moieties having a low glass transition temperature and/or surface tension can also improve the adhesion of the grafted polyvinyl alcohol polymer to the wet cellulose fibers as it reduces the strong intramolecular hydrogen bonding or molecular cohesive energy of polyvinyl alcohol, thus making more substantive cellulose.

The temporary water barrier can also be provided by grafting, onto the polyvinyl alcohol main chain, one or more branched alkyl acrylates, such as, but not limited to, 2-ethylheptyl acrylate, 2-ethylhexylacrylate, 2-ethylpentyl acrylate, 2-ethylbutyl acrylate and any combination thereof. In this aspect of the present invention, units of the one or more branched alkyl acrylates are present in side chains of the grafted polyvinyl alcohol polymer.

In an aspect of the present invention, the side chains providing units of an aliphatic monocarboxylic acid, units of an aliphatic dicarboxylic acid, units of a reactive quaternary ammonium salt, units of an aliphatic amide, and/or units of a branched alkyl acrylate, or any combination thereof, can be grafted to the acetate moieties of the vinyl acetate repeating units in the polyvinyl alcohol main chain. This grafting provides a grafted polyvinyl alcohol polymer according to structure (I):

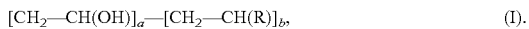

[CH$_2$—CH(OH)]$_a$—[CH$_2$—CH(R)]$_b$, (I).

In this structure, the total weight percent of (a) units can be from 74 wt % to 84 wt % based on the total weight of the grafted polyvinyl alcohol polymer. All values between 74 wt % and 84 wt % are included in this range, with the end points included, and thus the value can be 75 wt %, 76 wt %, 77 wt %, 78 wt %, 79 wt %, 80 wt %, 81 wt %, 82 wt %, and 83 wt %. The range can be from 74 wt % to 82 wt %, 77 wt % to 84 wt %, 80 wt % to 84 wt %, or 80 wt % to 82 wt %. The total weight percent of (b) units is from 16 wt % to 26 wt % based on the total weight of the grafted polyvinyl alcohol polymer. All values between 16 wt % and 26 wt % are included in this range, with the end points included, and thus the value can be 17 wt %, 18 wt %, 19 wt %, 20 wt %, 21 wt %, 22 wt %, 23 wt %, 24 wt %, and 25 wt %. The range can be from 16 wt % to 23 wt %, 16 wt % to 20 wt %, 20 wt % to 26 wt %, or 20 wt % to 23 wt %. The total weight percent of (a) and (b) units can equal, or is, 100 weight percent.

In structure (I), R is any combination of acetate and a side chain comprising units of an aliphatic monocarboxylic acid, units of an aliphatic dicarboxylic acid, units of a reactive quaternary ammonium salt, units of an aliphatic amide, units of a branched alkyl acrylate, or any combination thereof.

According to structure (I), there are multiple R groups; thus, some side chains do not have to contain any units of the reactive quaternary ammonium salt. The side chain at R that comprises units of a reactive quaternary ammonium salt monomer can comprise units of diallyl dimethyl ammonium chloride, 3-acrylamido propyl trimethyl ammonium chloride and/or any combination thereof. The side chain at R that comprises units of carboxylic acid can comprise units of acrylic acid, methacrylic acid, itaconic acid, methylene succinic acid and/or any combination thereof. The side chain at R that comprises units of an aliphatic amide can comprise units of acrylamide, methacrylamide, dimethyl acrylamide, diethyl acrylamide, dipropyl acrylamide, N-t-butylacrylamide and/or any combination thereof. The side chain at R that comprises units of a branched alkyl acrylate can comprise units of 2-ethylheptyl acrylate, 2-ethylhexylacrylate, 2-ethylpentyl acrylate, 2-ethylbutyl acrylate and/or any combination thereof. As used herein, the phrase "the side chain" is not limited to one side chain but can refer to multiple side chains of the same or similar structure.

In an alternative structure, side chains providing units of an aliphatic monocarboxylic acid, units of an aliphatic dicarboxylic acid, units of a reactive quaternary ammonium salt, units of an aliphatic amide, and/or units of a branched alkyl acrylate, or any combination thereof, can be grafted to the acetate moieties of the vinyl acetate repeating units in the polyvinyl alcohol main chain that has repeating units of vinyl alcohol units, ethylene units, and vinyl acetate units. This grafting provides a grafted polyvinyl alcohol polymer according to structure (II):

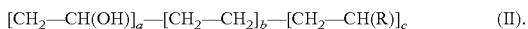

[CH$_2$—CH(OH)]$_a$—[CH$_2$—CH$_2$]$_b$—[CH$_2$—CH(R)]$_c$ (II).

In structure (II), the total weight percent of (a) units is from 90 wt % to 95 wt % based on the total weight of the grafted polyvinyl alcohol polymer. All values between 90 wt % and 95 wt % are included in this range, with the end points included, and thus the range includes, e.g., 91 wt %, 92 wt %, 93 wt %, and 94 wt %. The total weight percent of (b) units is from 1 wt % to 8 wt % based on the total weight of the grafted polyvinyl alcohol polymer. All values between 1 wt % and 8 wt % are included in this range, with the end points included, and thus the range includes, e.g., 2 wt %, 3 wt %, 4 wt %, 5 wt %, 6 wt %, and 7 wt %. The total weight percent of (c) units is from 1% to 3% based on the total weight of the grafted polyvinyl alcohol polymer. All values between 1 wt % and 3 wt % are included in this range, including 2 wt %, with the end points included.

According to structure (II), there are multiple R groups. Each R group can be an acetate unit or a side chain comprising units of an aliphatic monocarboxylic acid, units of an aliphatic dicarboxylic acid, units of a reactive quaternary ammonium salt, units of an aliphatic amide, and/or units of a branched alkyl acrylate, or any combination thereof. The side chain at R that comprises units of a reactive quaternary ammonium salt monomer can comprise units of diallyl dimethyl ammonium chloride, 3-acrylamido propyl trimethyl ammonium chloride and/or any combination thereof. The side chain at R that comprises units of carboxylic acid can comprise units of acrylic acid, methacrylic acid, itaconic acid, methylene succinic acid and/or any combination thereof. The side chain at R that comprises units of an aliphatic amide can comprise units of acrylamide, methacrylamide, dimethyl acrylamide, diethyl acrylamide, dipropyl acrylamide, N-t-butylacrylamide, and/or any combination thereof. The side chain at R that comprises units of a branched alkyl acrylate can comprise units of 2-ethylheptyl acrylate, 2-ethylhexylacrylate, 2-ethylpentyl acrylate, 2-ethylbutyl acrylate, and/or any combination thereof. As used herein, the phrase "the side chain" is not limited to one side chain but can refer to multiple side chains of the same or similar structure.

In another, alternative structure, a side chain, or side chains, providing amide, carboxylic, and/or polyethylene moieties can be grafted to acetate moieties of the polyvinyl alcohol main chain so as to provide a grafted polyvinyl alcohol polymer according to structure (III):

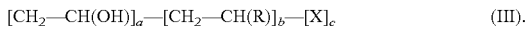

[CH$_2$—CH(OH)]$_a$—[CH$_2$—CH(R)]$_b$—[X]$_c$ (III).

In this structure, a is from 0.70 to 0.95, b is from 0.01 to 0.30, c is from 0 to 0.5, a+b+c=1, and X is any monomer ("X monomer") polymerizable with vinyl acetate.

For a, all values within this range are included; accordingly, a can be any of 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, and 0.94. Preferably, a is from 0.80 to 0.95, more preferably from 0.90 to 0.95.

For b, all values within this range are included; accordingly, b can be any of 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, and 0.29. Preferably, b is from 0.05 to 0.25, more preferably from 0.05 to 0.20.

For c, all values within this range are included; accordingly, c can be any of 0.1, 0.2, 0.3, and 0.4. Preferably, c is from 0.1 to 0.5.

According to structure (III), there are multiple R groups. Each R group can be an acetate unit or a side chain comprising units of an aliphatic monocarboxylic acid, units of an aliphatic dicarboxylic acid, units of a reactive quaternary ammonium salt, units of an aliphatic amide, units of a branched alkyl acrylate, or any combination thereof. The side chain at R that comprises units of a reactive quaternary ammonium salt monomer can comprise units of diallyl dimethyl ammonium chloride, 3-acrylamido propyl trimethyl ammonium chloride and/or any combination thereof. The side chain at R that comprises units of carboxylic acid can comprise units of acrylic acid, methacrylic acid, itaconic acid, methylene succinic acid and/or any combination thereof. The side chain at R that comprises units of an aliphatic amide can comprise units of acrylamide, methacrylamide, dimethyl acrylamide, diethyl acrylamide, dipropyl acrylamide, N-t-butylacrylamide, and/or any combination thereof. The side chain at R that comprises units of a branched alkyl acrylate can comprise units of 2-ethylheptyl acrylate, 2-ethylhexylacrylate, 2-ethylpentyl acrylate, 2-ethylbutyl acrylate, and/or any combination thereof. As used herein, the phrase "the side chain" is not limited to one side chain but can refer to multiple side chains of the same or similar structure. Each of a, b, and c represents molar amounts of moieties within structure (III), described above.

In structure (III), the X monomer is any monomer that can polymerize with vinyl acetate under any reaction condition that forms a polyvinyl alcohol. As an option, the X monomer can be ethylene, propylene, butylene, 1-pentene, and 4-methyl-1-pentene. Other options for the X monomer include, but are not limited to, vinyl fluoride, vinyl chloride, vinyl bromide, styrene, vinyl ketone, (meth)acrylonitrile, acrylophenone, methyl (meth)acrylate, ethyl (meth)acrylate, propyl (meth)acrylate, (iso)butyl (meth)acrylate, butyl cyanoacrylate, glycidyl (meth)acrylate, (meth)acrylic acid, itaconic acid, ethyl cyanoacrylate, N-(2-hydroxypropyl) methacrylamide, (meth)acrolein, (meth)acrylamide, methyl 2-chloroacrylate, methyl 2-fluoroacrylate, methyl cyanoacrylate, vinyl propionate, N-vinylacetamide, 4-vinylbenzyl chloride, 2-vinylpyridine, 4-vinylpyridine, N-vinylpyrrolidone, vinylsilane, vinylsulfonic acid, or 4-vinyltoluene, vinyltriethoxysilane, or any combination thereof.

No matter the structure, the polyvinyl alcohol main chain in the grafted polyvinyl alcohol of the present invention can have incorporated therein units that provide an additional functionality, such as a carboxyl functionality, an amine functionality, an amide functionality, or an imide functionality, or any combination thereof, in an amount not more than 3 mol %.

No matter the structure, and for any form of the polyvinyl alcohol main chain, side chains can be grafted to about 90% to about 100% of the vinyl acetate repeating units available within the polyvinyl alcohol main chain and/or can be grafted to about 90% to about 100% of vinyl alcohol repeating units within the polyvinyl alcohol main chain. All values between these ranges are included, and therefore the value can be 91%, 92%, 93%, 94%, 95%, 96%, 97%, 98%, and 99%.

As an option, regardless of how produced, the grafted polyvinyl alcohol polymer can have or include a structure (IV)

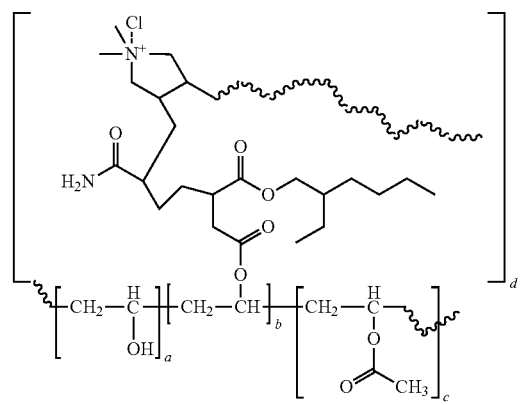

Structure (IV)

In structure (IV), the total weight percent of a is 30% to 34% based on the total weight of the grafted polyvinyl alcohol polymer; the total weight percent of b is 6% to 10% based on the total weight of the grafted polyvinyl alcohol polymer; the total weight percent of c is 0.5% to 1.0% based on the total weight of the grafted polyvinyl alcohol polymer; and the total weight percent of d is 58% to 62% based on the total weight of the grafted polyvinyl alcohol polymer.

For a, all values between 30 wt % and 34 wt % are included in this range, with the end points included, and thus the range includes, e.g., 31 wt %, 32 wt %, and 33. For b, all values between 6 wt % and 10 wt % are included in this range, with the end points included, and thus the range includes, e.g., 7 wt %, 8 wt %, and 9 wt %. For c, all values between 0.5 wt % and 1.0 wt % are included in this range, with the end points included, and thus the range includes, e.g., 0.6 wt %, 0.7 wt %, 0.8 wt %, and 0.9 wt %. For d, all values between 58 wt % and 62 wt % are included in this range, with the end points included, and thus the range includes, e.g., 59 wt %, 60 wt %, and 61 wt %.

The side chain monomers can be attached to the polyvinyl alcohol main chain in ratio range of from 1:2:8 to 1.5:3:6 on a weight basis and normalized to an amount of (b) aliphatic amide. The grafted polyvinyl alcohol polymer can have various desirable properties, such as, but not limited to, a water dispersibility of at least 25 wt % solids, such as from 23 wt % to 27 wt % solids or more, and/or the ability to form a dry solid particulate.

Depending upon the desired properties, the grafted polyvinyl alcohol polymer of the present invention can comprise a polyvinyl alcohol main chain weight percent of about 40% to about 42%, preferably 40% to 50%, by total solid weight, a quaternary ammonium salt side chain weight percent of about 5% to about 10%, preferably 6% to 8%, by total solid weight, an aliphatic amide weight percent from about 4% to about 10%, preferably 5% to 8%, by total solid weight, and a branched alkyl acrylate weight percent from about 35% to about 45%, by total solid weight.

As another option, regardless of how produced, the grafted polyvinyl alcohol polymer can have or include structure (V):

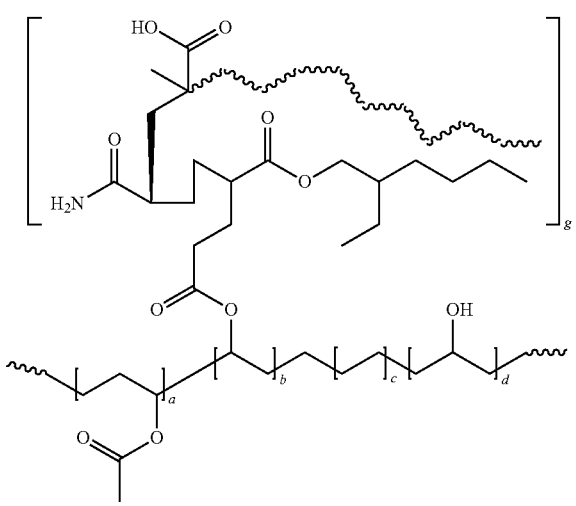

In structure (V), the total weight percent of a is 0.05% to 0.5% based on total weight percent, the total weight percent of b is 1.25% to 2.5% based on total weight percent, the total weight percent of c is 0.5% to 4.0% based on total weight percent, the total weight percent of d is 40% to 42% based on total weight percent, and the total weight percent of g is 50% to 60%, such as 55% based on total weight percent.

In structure (V), the side chain monomers can be attached to the polyvinyl alcohol main chain in an a:b:c ratio range of from 3:1:5 to 2.5:1:4 on a weight basis and normalized to an amount of (b) aliphatic amide.

To form a grafted polyvinyl alcohol of the present invention, a side chain can be grafted onto vinyl acetate and/or vinyl alcohol repeating units of the polyvinyl alcohol main chain by various mechanisms. For instance, sides chains comprising a vinyl moiety, such as, but not limited to, methylene succinic acid, acrylates, acrylic acids, methacrylates, reactive quaternary ammonium salt monomers and/or methacrylic acids, can be added to the polyvinyl alcohol main chain by radical induced polymerization of the monomers in the presence of free PVOH. Radical induced polymerization of the monomers can be accomplished by grafting the side chains to the polymer in the presence of a free radical forming initiator, such as an oxidizer and/or a reducer. Suitable free radical forming initiations include, but are not limited to, peroxides, azo compounds, potassium persulfates, ammonium persulfates, and/or any combination thereof. Suitable reducers, include, but are not limited to, sodium bisulfate, sodium metabisulphite, sodium formaldehyde sulphoxylate, iron (II) sulphate, and/or any combination thereof. Suitable oxidizers, include, but are not limited to, t-butyl hydroperoxide, hydrogen peroxide, ammonium persulfate, benzyol peroxide, dicumyl peroxide, and/or any combination thereof. Accordingly, the grafted polyvinyl alcohol polymer can be made by providing an aqueous solution of a free, unreacted polyvinyl alcohol polymer, and adding, to the aqueous solution, a free-radical forming initiator and the desired plurality of side chain-forming monomers. The side chain monomers added to the aqueous solution can include: (a) reactive quaternary ammonium salt monomers side chain comprising at least one of an aliphatic, an allylic, a vinylic, and an acrylic quaternary ammonium salt; (b) an aliphatic amide; and (c) a branched alkyl acrylate. Other side chains can include units of an aliphatic amide and/or units of a branched alkyl acrylate while having no units of the aliphatic, allylic, a vinylic, and acrylic quaternary ammonium salts.

To control the pH of the aqueous solution, a buffer salt such as, but not limited to, sodium bicarbonate, sodium acetate, sodium dihydrogen phosphate, and/or any combination thereof, can be used.

After a sufficient period of time, (e.g. three to four hours or more hours), the free residual monomers can be suppressed by adding a sufficient amount of reduction/oxidation couple, such as, but not limited to, sodium formaldehyde sulfoxylate 0.01%/t-Butyl hydroperoxide 0.08% (weight %), a hydrogen peroxide/iron (II) compound, and/or any combination thereof. The sufficient amount of the reduction/oxidation couple is not particularly limited so long as suppression of the free residual monomers occurs. Preferably, the amount of the reduction/oxidation couple is 0.005 and 0.08 weight % respectively.

The grafted polyvinyl alcohol polymer can have various desirable properties, such as, but not limited to, a water dispersibility of at least 16 wt % solids, such as from 16 wt % to 20 wt % solids or more, and/or the ability to form of a dry solid particulate.

Depending upon the desired properties, the grafted polyvinyl alcohol polymer can comprise a polyvinyl alcohol main chain weight percent of about 30% to about 60%, preferably 40% to 50%, by total solid weight, a carboxylic acid side chain weight percent of about 12% to about 25%, preferably 15% to 21%, by total solid weight, an aliphatic amide weight percent from about 2.5% to about 15%, preferably 6% to 11%, by total solid weight, and a branched alkyl acrylate weight percent from about 20% to about 35%, by total solid weight.

As a further option, the grafted polyvinyl alcohol polymer, or the polyvinyl alcohol main chain thereof, can be, or is, cross-linked. The cross-linking can occur by internal ionic or covalent bonding between moieties of the polyvinyl alcohol main chain. Alternatively, the cross-linking can be carried out by reacting any suitable cross-linker with moieties of the polyvinyl alcohol main chain.

The present invention also relates to a polymer mixture that can comprise, consist essentially of, consist of, include, or has, a first grafted polyvinyl alcohol polymer comprising a first polyvinyl alcohol main chain and a first plurality of side chains grafted to the first polyvinyl alcohol main chain, wherein side chains from the first plurality of side chains comprise: i) one or more units selected from: an aliphatic monocarboxylic acid and an aliphatic dicarboxylic acid; and, optionally, ii) an aliphatic amide, or a branched alkyl acrylate, or any combinations thereof; and a second grafted polyvinyl alcohol polymer comprising a second polyvinyl alcohol main chain and a second plurality of side chains grafted to the second polyvinyl alcohol main chain, wherein side chains from the second plurality of side chains comprise: i) one or more units of a reactive quaternary ammonium salt; and, optionally, ii) an aliphatic amide, or a branched alkyl acrylate, or any combinations thereof.

The polymer mixture can comprise, consist of, consist essentially of, include, or have, the first grafted polyvinyl alcohol polymer and the second grafted polyvinyl alcohol polymer in a first grafted polyvinyl alcohol polymer:second grafted polyvinyl alcohol polymer weight ratio of from 10:1 to 1:10, or other weight ratios outside of this range.

Each of the first grafted polyvinyl alcohol polymer and the second grafted polyvinyl alcohol polymer can have any structure described herein.

The first grafted polyvinyl alcohol polymer can function as retention aide to the second grafted polyvinyl alcohol, or vice versa. Both the first grafted polyvinyl alcohol and the second grafted polyvinyl alcohol can be considered as a two-component crosslinking system due to the difference in particle charge density between the two grafted polyvinyl alcohol.

The polymer mixture of the present invention can be used in any process described herein that is performed with, on, or to the grafted polyvinyl alcohol polymer.

A polymer composition can be produced by dispersing the grafted polyvinyl alcohol polymer of the present invention within an aqueous medium.

The grafted polyvinyl alcohol polymer of the present invention can be incorporated into various products. For instance, the polymer can be incorporated into paper products to increase wet strength, and/or dry strength, and/or provide temporary water repellency, and/or provide water absorption delay properties.

Incorporating the polymer into a paper product can be accomplished by producing a fibrous pulp comprising a fibrous material suitable for paper production, such as, but not limited to, cellulosic fibers, and the grafted polyvinyl alcohol polymer. Preferably, the fibrous material includes negative charged moieties, such as, but not limited to, carboxylate moieties. The fibrous pulp can be transformed into an aqueous suspension, within which the grafted polyvinyl alcohol polymer can be absorbed or adsorbed onto the fibrous material. The aqueous suspension can be provided by adding the grafted polyvinyl alcohol polymer to a pulp stock, preferably which contains negatively charged moieties. For instance, the polymer can be added to a pulp stock comprising cellulosic paper making fibers. Regardless of how provided, the suspension can then be formed into a web and dried to provide a paper product. Forming the suspension into a web can be accomplished by draining the suspension after the grafted polyvinyl alcohol polymer has adsorbed onto the fibrous material.

Preferably, the aqueous suspension comprises an amount of the grafted polyvinyl alcohol polymer effective to increase wet strength, and/or dry strength, and/or water dispersibility, as compared to a paper product made with the aqueous suspension absent the grafted polyvinyl alcohol polymer. For instance, in the case of a cellulose paper product, the aqueous suspension can comprise from 4 to 10 pounds of the grafted polyvinyl alcohol polymer per ton of dry cellulose papermaking fiber. Ideally, the amount of the grafted polyvinyl alcohol polymer within the aqueous suspension is effective to increase wet strength and/or paper dry strength by at least 10% (e.g. 10% to 50% or more) as compared to the paper product made with the aqueous suspension absent the grafted polyvinyl alcohol polymer.

The wet strength of a paper product can be measured by subjecting a dry piece of the paper product to 100% relative humidity for five minutes at room temperature, and then measuring the tensile strength of the moist paper product. The tensile strength can be measured by the following method:

1—Cut blotter paper strips 13×150 mm using cutter machine;
2—Condition all strips at 45° C. for 12 Hours;
3—Condition all strips at room temperature (RT) (e.g. 25° C.) for at least 2 hours inside a desiccator;
4—Prepare 0.0015 wt % polymer solution or whatever polymer concentration needed;
5—Immerse each strip in the 0.0015 wt % polymer solution for one second or simply dip it and take out;
6—Lay down each set of strips onto a sheet of blotter paper;
7—Dry the strips at 60° C. for 24 H;
8—Condition all strips in a desiccator at RT for at least 2 H;
9—Use 50 Kg Load cell to test tensile strength;
10—Test 5 strips from each set to measure the Dry Tensile strength;
11—Take 5 strips of each set at a time and place them in the humidity chamber at 100% RH and room temperature for 5 min;
12—Add a glass bottle open inside the chamber to hold the strips after the five minutes;
13—After 5 minutes of 100% RH, keep the strips inside the glass bottle and close it tightly to keep the moisture level as constant as possible inside the strips
14—Test 5 strips from each set to for wet tensile strength using the same tensiometer software set up for Dry tensile strength.

Other methods of testing wet strength can include a standard test method known as TAPPI T-465 om-15, where a paper specimen is bent and immersed in a water cup (The Finch Cup) for a moment before tested on a tensiometer.

Dry strength of a paper product can be measured by a similar method for measuring the tensile strength as described above, except that the hand casted sheets are cut in a size of, for example, 13×127 mm and then conditioned at RT and 50% relative humidity for several hours before measuring the tensile strength onto the tensiometer.

Water dispersibility can be measured by cutting 10×20 mm hand casted and/or blotter paper specimens, then conditioning the specimens at 50° C. and 50% relative humidity for 4 hours. Each paper specimen is then placed in a beaker with 200 ml DI water. The water containing the paper specimen is then magnetically agitated at 300 rpm. The time for complete dispersion of paper specimen is recorded. The paper specimens treated with grafted polyvinyl alcohol showed dispersion time less than 60 seconds, however those treated with G-PAM showed more than 180 seconds and/or no dispersion at all for some other G-PAM batches.

Water repellency can be measured by placing a drop of water on the top of treated blotter paper with the grafted polyvinyl alcohol polymer and recording the time needed for this water droplet to diffuse into the treated blotter paper.

Regardless of the strength, water repellency, and/or dispersibility that can be provided, the amount of the grafted polyvinyl alcohol polymer within the aqueous suspension can provide a ratio of paper wet strength, as determined by Finch Cup method and/or humidity chamber method, to dry strength as determined by tensiometer of about 0.6, or 0.6±0.2 or 0.6±0.1.

The paper product, regardless of how produced, can comprise a paper material and the grafted polyvinyl alcohol polymer. The paper material of the paper product can comprise a cellulosic fiber having carboxylic moieties electrostatically interacting with protonated amines and quaternary ammonium salts on a portion of the aliphatic amides grafted to the repeating units of the polyvinyl alcohol main chain.

The paper product can be incorporated into a further product comprising a layer of the paper product, such as, but not limited to, paper sheeting, paperboard, tissue paper, or wallboard. Accordingly, the paper layer can comprise a cellulosic fiber having carboxyl moieties electrostatically interacting with protonated amines and quaternary ammonium salts on a portion of the aliphatic amides and/or reactive quaternary ammonium salts grafted to the repeating units of the polyvinyl alcohol main chain.

The grafted polyvinyl alcohol polymer of the present invention can be used to treat fibrous materials other than paper products. For instance, clothes having a fibrous material containing negatively charged moieties can be treated with the polymer. For instance, a fibrous material comprising cotton fibers having carboxylic moieties electrostatically interacting with protonated amines and/or quaternary ammonium salts on a portion of the aliphatic amides and/or reactive quaternary ammonium salts grafted to the repeating units of the poly(vinyl alcohol-co-vinyl acetate) can be produced. Regardless of the types of fibers within the material, the fibrous material can be obtained by coating and/or impregnating the fibers with the grafted polyvinyl alcohol polymer.

The monomer variety and relative concentrations to polyvinyl alcohol polymers are relevant for achieving desired performance of this temporary wet strength in imparting the needed wet strength during end use or customer application and allowing complete dispersibility in a sewage line after being disposed. This "smart" performance of dual opposite functions distinguishes this polymer from covalent crosslinking products that can do one function only at a certain pH range.

As with other commonly used additives to improve wet strength, the conventional glyoxylated polyacrylamide covalently attaches to the paper fibers. Additionally, it lacks hydroxyl residues along its backbone. The lack of hydroxyl residues limits the ability of glyoxylated polyacrylamide treated papers to become mechanically strained by swelling water. Even if a sufficient amount of water could be swelled by the glyoxylated polyacrylamide treated paper, the covalent attachment between glyoxylated polyacrylamide and the paper fibers prevent the resulting mechanical strain from dispersing the paper. Unlike glyoxylated polyacrylamide, the grafted polyvinyl alcohol polymers of the present invention are attached to the paper fibers by an electrostatic interaction between protonated amine and/or quaternary ammonium salt moieties and negatively charged carboxylic moieties within the paper fibers. This weaker electrostatic interaction is more susceptible to breaking when the grafted polyvinyl alcohol swells water. As such, the weaker electrostatic interaction between protonated amine units and/or reactive quaternary ammonium salt units within the grafted polyvinyl alcohol polymer and the paper fibers contributes to the improved water dispersibility. Similar results would thus be expected in comparison to other additives covalently linked to paper fibers.

The present invention will be further clarified by the following examples, which are intended to be exemplary of the present invention.

EXAMPLES

Examples 1-4

Synthesis and Characterization of the Grafted Polyvinyl Alcohol Polymer (TWS 15)

Examples of the grafted polyvinyl alcohol was prepared by dissolving a polyvinyl alcohol polymer (CAS #25213-24-5) at 15 wt. % solid content in water. Then, diallyl dimethyl ammonium chloride (CAS #7398-69-8) as the quaternary ammonium salt side chain monomer, acrylamide (CAS #79-06-1) as the aliphatic amide side chain monomer, and 2-ethylhexyl acrylate (CAS #103-11-7) as the branched alkyl acrylate side chain monomer, were added to the PVOH aqueous solution. Diallyl dimethyl ammonium chloride and acrylamide were added to the 15% PVOH aqueous solution at 65° C. 2-ethylhexyl acrylate was added, via dropwise addition, over a period of time of 120 minutes. Sodium bisulfate (CAS #7631-90-5), and ammonium persulphate (CAS #7727-54-0) were then added to the emulsion as free radical forming initiators and sodium bicarbonate (CAS #144-55-8) as a buffering salt. Semi-continuous polymerization was then initiated by feeding a 0.8 wt % ammonium persulfate solution at 65° C. for 240 minutes. Polymerization was then propagated for 80° C. for 2 hours while the ammonium persulfate was feed into the emulsion at a constant rate. The free residual monomers were then suppressed by adding hydrogen peroxide (CAS #7722-84-1), and t-butyl hydroperoxide (CAS #75-91-2) to the emulsion in 0.1% w/w. The agitation 200-300 rpm was maintained for 1 hour at 80 C. The batch was then cooled down to room temperature before discharge to the packaging totes.

The final emulsion had the following weight percentages:

| Chemical Name | Example 1 M5-TWS 13 wt % | Example 2 M7-TWS 13 wt % | Example 3 M8-TWS13 wt % | Example 4 M9-TWS 13 wt % |
|---|---|---|---|---|
| Water | 76.5 | 75 | 75 | 75 |
| Acrylamide | 1.42 | 1.40 | 1.40 | 1.40 |
| Methacrylic Acid | 0 | 0 | 1.40 | 1.40 |
| Diallyl dimethyl ammonium chloride | 1.85 | 1.83 | 0.0 | 0.0 |
| 2-Ethylhexyl Acrylate | 8.57 | 11.26 | 11.42 | 11.42 |
| Polyvinyl alcohol (CAS # 25213-24-5]) | 10.71 Poval 5-74 | 10.56 Poval 3-80 | 9.8 Poval 3-80 | 10.72 Poval 5-74 |
| Sodium Bicarbonate | 0.002 | 0.01 | 0.01 | 0.01 |
| Ammonium Persulfate | 0.075 | 0.075 | 0.075 | 0.16 |
| Sodium Bisulfate | 0.028 | 0.01 | 0.01 | 0.05 |
| Hydrogen Peroxide | 0.015 | 0.08 | 0.08 | 0.08 |
| t-Butyl hydroperoxide | 0.015 | 0.08 | 0.08 | 0.08 |
| Total | 100 | 100 | 100 | 100 |

The grafted polyvinyl alcohol polymer produced was then characterized by Fourier-transform infrared spectroscopy, particle size analysis by dynamic light scattering, Gel permeation chromatography, pH, and dispersion solid content.

The degree of hydrolysis (%) of the above examples as percentages was as follows: M5-TWS13 (74%), M7-TWS13 (80%), M8-TWS13 (80%) and M9-TWS13 (74%).

Temporary Wet Strength Wet Strength Decay Testing

Hand casted sheets were prepared by blending soft and hard wood pulps in 1:1 weight ratio. The pulp was diluted to 1 wt % consistency. 1 L of the diluted pulp was treated to 10 lbs/ton equivalent of different examples of the embodiment as Examples 1-4. Hand Casted sheets was cut into 13×127×0.125 mm strips. Examples 3&4 were slightly anionic by methacrylic acid side chain moieties. Examples 1&2 were slightly cationic by the quaternary ammonium salt side chain moieties. Examples 1&4 had polyvinyl alcohol of a lower degree of hydrolysis than the one used in Examples 3&4.

Figure 4:
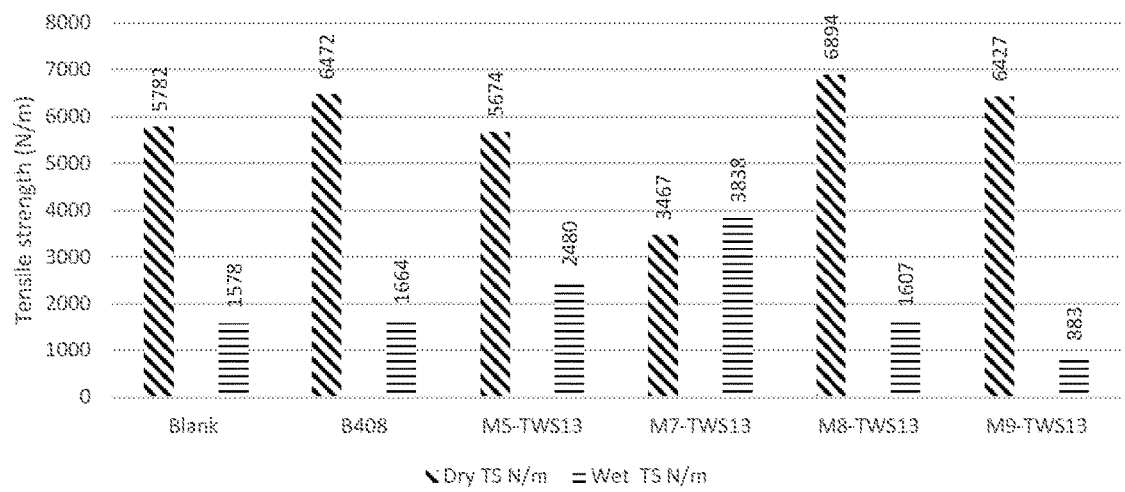
FIG. 4 is a bar graph that shows the wet and dry strengths of hand casted paper sheets treated with some preparation examples of the grafted polyvinyl alcohol resin of the present invention.
Figure 5:
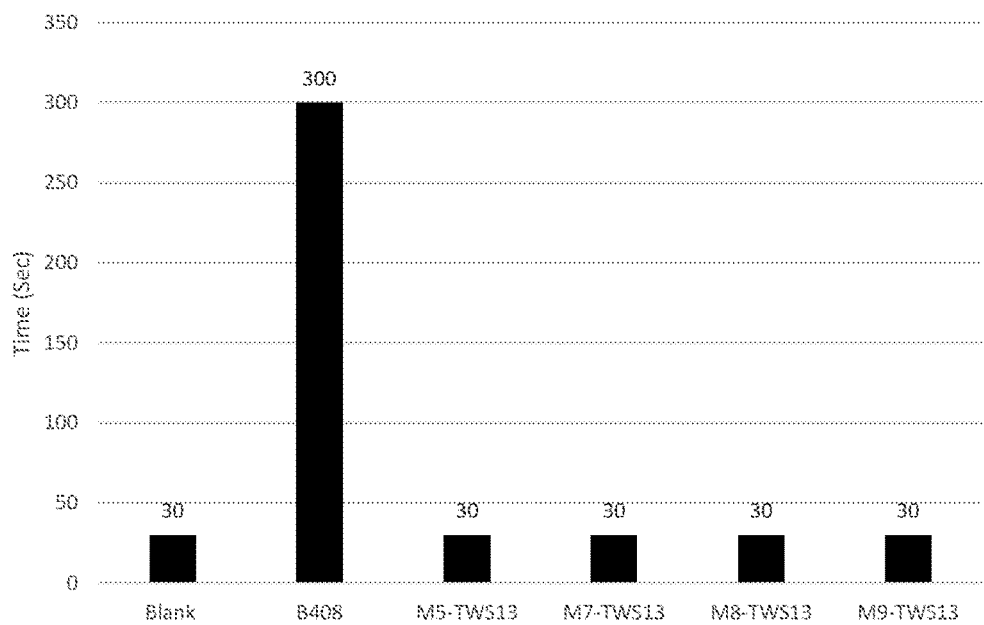
FIG. 5 is a bar graph that shows the paper dispersibility test of hand casted paper sheets treated with some preparation examples of the grafted polyvinyl alcohol resin of the present invention.
Figure 6:
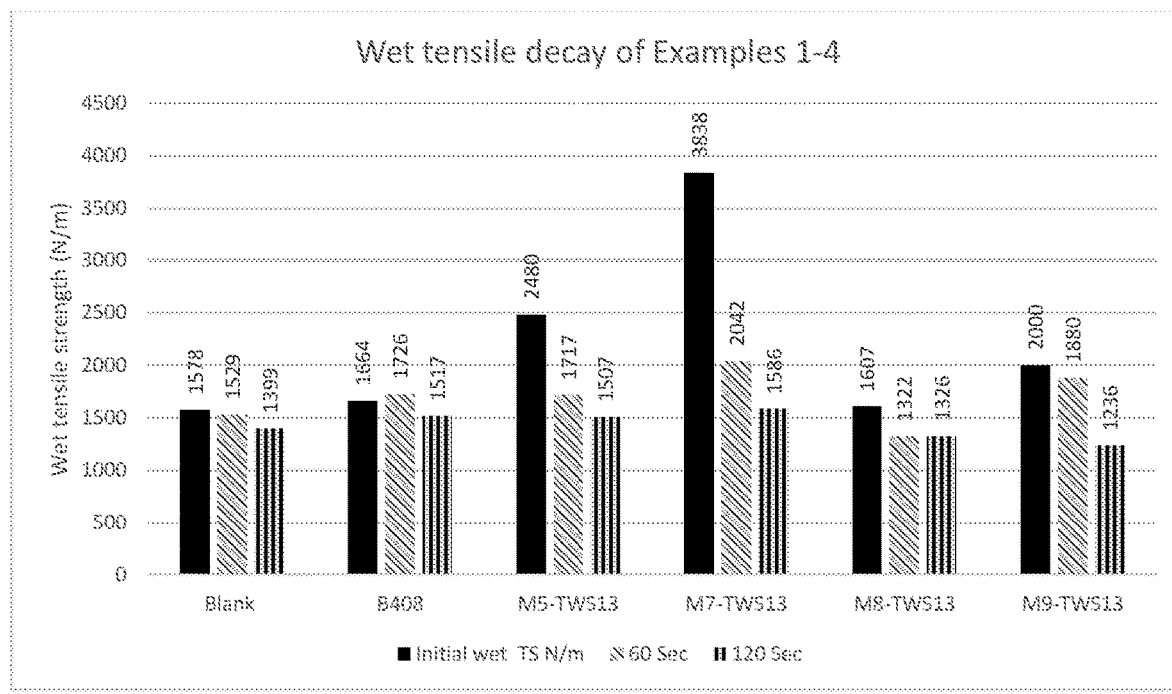
FIG. 6 is a bar graph that shows a comparison of wet strength decay of hand casted paper sheets treated with examples of the grafted polyvinyl alcohol polymer of the present invention and compared to paper treated with glyoxylated polyacrylamide.

All hand-made strips were left to dry at 90° C. for 24 hours, and then conditioned at room temperature for 2 hours in a desiccator. The hand casted strips were then subjected to TAPPI T-465 om-15, where a paper specimen is bent and immersed in a water cup (The Finch Cup). Tensile strength and wet strength decay were measured. The results of the dry and wet tensile strength are shown in FIG. 4. The water dispersibility of handmade sheets treated with examples 1-4 and GPAM is shown in FIG. 5, and wet strength decay is shown in FIG. 6 for the four Examples versus a blank and glyoxylated G-PAM.

As can be seen from FIG. 4, strips treated with glyoxylated polyacrylamide and grafted polyvinyl alcohol polymer dispersions had similar dry strength except M7-TWS13. The strips treated with slightly cationic resins examples, Examples 1&2 (M5 and M7]) showed double and triple the wet strength of those treated with G-PAM. The wet/dry tensile strengths of M5-TWS13 and M7-TWS13 were superior to those of Blank, G-PAM, and slightly anionic resins. The wet tensile strength decay of strips treated with cationic resins, M5-TWS13 and M7-TWS13, outperformed Blank, G-PAM, and anionic resins where the initial wet strength drops to about ½ after 120 seconds, however it remains almost the same after the same period for the rest of specimens.

Example 5-8

Synthesis and Characterization of the Grafted Polyvinyl Alcohol Polymer (TWS 15)

A grafted polyvinyl alcohol polymer was prepared by dissolving a polyethylene vinyl alcohol polymer (CAS #26221-27-2) at 10 wt % solid content in water. Then, methacrylic acid (CAS #79-41-4) as the carboxylic acid side chain monomer, acrylamide (CAS #79-06-1) as the aliphatic amide side chain monomer, and 2-ethylhexyl acrylate (CAS #103-11-7) as the branched alkyl acrylate side chain monomer were emulsified in the 10 wt % polyethylene vinyl alcohol polymer solution for at least 30 minutes. Sodium bisulfate (CAS #7631-90-5), and ammonium persulphate (CAS #7727-54-0) were added to the emulsion as free radical forming initiators and sodium bicarbonate (CAS #144-55-8) as a buffering salt. Batch polymerization was then initiated by feeding a 0.8 wt % ammonium persulfate solution at 60° C. Polymerization was then propagated at 80° C. for 2 hours while the ammonium persulfate was feed into the emulsion at a constant rate. The free residual monomers were then suppressed by adding sodium formaldehyde sulfoxylate (CAS #6035-47-8), hydrogen peroxide (CAS #7722-84-1), and t-butyl hydroperoxide (CAS #75-91-2) to the emulsion. The agitation 200 rpm was maintained for 1 hour at 80 C. The batch was then cooled down to room temperature.

The final emulsion had the following weight percentages:

| Chemical Name | Example 5 TWS 15 | Example 6 TWS 16 | Example 7 TWS 22 | Example 8 TWS 18 |
|---|---|---|---|---|
| Water | 84 | 84 | 84 | 77 |
| Acrylamide | 1.5 | 1.5 | 1.5 | 6.66 |
| Methacrylic Acid | 3 | 3 | 3 | 3.33 |
| 2-Ethylhexyl Acrylate | 4.47 | 4.47 | 4.47 | 8.33 |
| Polyvinyl alcohol [CAS # 26221-27-2] | 6.765 | 6.765 | 6.765 | 4.29 |
| Sodium Bicarbonate | 0.01 | 0.01 | 0.01 | 0.01 |
| Ammonium Persulfate | 0.075 | 0.075 | 0.075 | 0.16 |
| Sodium Bisulfate | 0.01 | 0.01 | 0.01 | 0.05 |
| Sodium Formaldehyde Sulfoxylate | 0.01 | 0.01 | 0.01 | 0.01 |
| Hydrogen Peroxide | 0.08 | 0.08 | 0.08 | 0.08 |
| t-Butyl hydroperoxide | 0.08 | 0.08 | 0.08 | 0.08 |
| Total | 100 | 100 | 100 | 100 |

The grafted polyvinyl alcohol polymer produced was then characterized by Fourier-transform infrared spectroscopy, Particle size analysis by dynamic light scattering, Gel permeation chromatography, pH, and dispersion solid content.

Examples 9 & 10

Temporary Wet Strength and Dispersibility Comparative Testing

Blotter paper was cut into 13×127×0.125 mm stipes. 10 strips were dipped for 1 second in 0.0015 wt % polymer solutions of glyoxylated polyacrylamide, grafted polyvinyl alcohol polymer TWS-15, 16, 22 and 18. Polyvinyl alcohol polymers TWS-16 and TWS-22 were prepared by a method analogous to those detailed in Example 5, with the exception that TWS 16 & 22 were prepared by starting in a semi-continuous mode, for adding methacrylic acid and acrylamide when the reaction temperature reached 62° C. and 40° C. respectively. Example 8 (TWS 18) had a different composition where the poly alkylene vinyl alcohol concentration was lowered and the two monomers' concentrations, acrylamide and 2-ethylhexyl acrylate, were higher than the rest of examples as shown above in the chemical composition table.

All dipped strips were left to dry at 50° C. for 24 hours. The dipped strips were then conditioned at room temperature for two hours in a desiccator. The dipped strips were then subjected to 100% relative humidity for 5 minutes at room temperature. Each set of dipped strips were then taken from the humidity chamber in closed glass bottles, in order to keep the moisture level constant, for wet tensile strength measurement and dispersibility evaluation. Tensile strength and dispersibility were measured as described above. The results of the wet tensile strength and dispersibility evaluations shown are shown in FIG. 7.

Figure 7:
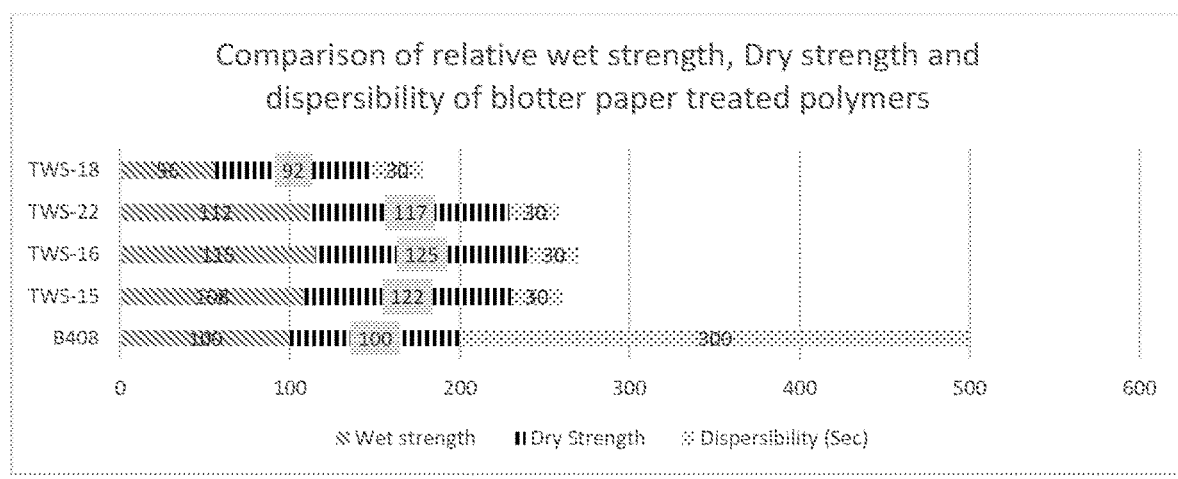
FIG. 7 is a bar graph that shows a comparison of relative wet and dry strengths in addition to water dispersibility of handmade sheets treated with some examples of the present invention.

As can be seen from FIG. 7, strips dipped in the glyoxylated polyacrylamide and grafted polyvinyl alcohol polymer dispersions had similar wet strength except TWS 18 which has different chemical recipe. The strips dipped in the grafted polyvinyl alcohol polymer solutions had significantly better water dispersibility than the strips treated with glyoxylated polyacrylamide grafted polyvinyl polymers.

The present invention includes the following aspects/embodiments/features in any order and/or in any combination.

1. A grafted polyvinyl alcohol polymer comprising a polyvinyl alcohol main chain and a plurality of side chains grafted to the polyvinyl alcohol main chain,
   wherein one or more of said side chains from the plurality of side chains comprise: i) one or more units selected from: an aliphatic monocarboxylic acid, an aliphatic dicarboxylic acid, and a reactive quaternary ammonium salt; and, optionally, ii) units of an aliphatic amide, or a branched alkyl acrylate, or any combinations thereof.

2. The grafted polyvinyl alcohol polymer according to any preceding or following embodiment/feature/aspect, wherein at least 75%, by number, of said side chains from the plurality of side chains comprise: i) one or more units selected from: the aliphatic monocarboxylic acid, the aliphatic dicarboxylic acid, and the reactive quaternary ammonium salt; and, optionally, ii) units of the aliphatic amide, or of the branched alkyl acrylate, or any combinations thereof.

3. The grafted polyvinyl alcohol polymer according to any preceding or following embodiment/feature/aspect, wherein not more than 25%, by number, of side chains from the plurality of side chains comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

4. The grafted polyvinyl alcohol polymer according to any preceding or following embodiment/feature/aspect, wherein one or more of said side chains from the plurality of side chains comprise units of the aliphatic amide, or units of the branched alkyl acrylate, or any combinations thereof.

5. The grafted polyvinyl alcohol polymer according to any preceding or following embodiment/feature/aspect, wherein side chains from the plurality of side chains comprise: i) units of the reactive quaternary ammonium salt; and, optionally, ii) units of the aliphatic amide, or units of the branched alkyl acrylate, or any combinations thereof.

6. The grafted polyvinyl alcohol polymer according to any preceding or following embodiment/feature/aspect, wherein at least 75%, by number, of the side chains from the plurality of side chains comprise: i) units of the reactive quaternary ammonium salt; and, optionally, ii) units of the aliphatic amide, or units of the branched alkyl acrylate, or any combinations thereof.

7. The grafted polyvinyl alcohol polymer according to any preceding or following embodiment/feature/aspect, wherein not more than 25%, by number, of side chains from the plurality of side chains comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

8. The grafted polyvinyl alcohol polymer according to any preceding or following embodiment/feature/aspect, wherein at least 75%, by number, of the side chains from the plurality of side chains comprise: i) units of the reactive quaternary ammonium salt; and, optionally, ii) units of the aliphatic amide, or units of the branched alkyl acrylate, or any combinations thereof, and do not have any units of the aliphatic monocarboxylic acid and of the aliphatic dicarboxylic acid.

9. The grafted polyvinyl alcohol polymer according to any preceding or following embodiment/feature/aspect, wherein not more than 25%, by number, of side chains from the plurality of side chains comprise units of the aliphatic amide, or units of the branched alkyl acrylate, or any combinations thereof, and have no units the aliphatic monocarboxylic acid, the aliphatic dicarboxylic acid, and the reactive quaternary ammonium salt.

10. The grafted polyvinyl alcohol polymer according to any preceding or following embodiment/feature/aspect, wherein one or more of said side chains from the plurality of side chains comprise units of the aliphatic amide, or units of the branched alkyl acrylate, or any combinations thereof.

11. The grafted polyvinyl alcohol polymer according to any preceding or following embodiment/feature/aspect, wherein side chains from the plurality of side chains comprise: i) one or more units selected from: the aliphatic monocarboxylic acid and the aliphatic dicarboxylic acid; and, optionally, ii) units of the aliphatic amide, or units of the branched alkyl acrylate, or any combinations thereof.

12. The grafted polyvinyl alcohol polymer according to any preceding or following embodiment/feature/aspect, wherein at least 75%, by number, of the side chains from the plurality of side chains comprise: i) one or more units selected from: the aliphatic monocarboxylic acid and the aliphatic dicarboxylic acid; and, optionally, ii) units of the aliphatic amide, or units of the branched alkyl acrylate, or any combinations thereof.

13. The grafted polyvinyl alcohol polymer according to any preceding or following embodiment/feature/aspect, wherein not more than 25%, by number, of side chains from the plurality of side chains comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

14. The grafted polyvinyl alcohol polymer according to any preceding or following embodiment/feature/aspect, wherein at least 75%, by number, of the side chains from the plurality of side chains comprise: i) one or more units selected from: the aliphatic monocarboxylic acid and the aliphatic dicarboxylic acid; and, optionally, ii) units of the aliphatic amide, or units of the branched alkyl acrylate, or any combinations thereof, and do not have any units of the reactive quaternary ammonium salt.

15. The grafted polyvinyl alcohol polymer according to any preceding or following embodiment/feature/aspect, wherein not more than 25%, by number, of side chains from the plurality of side chains comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

16. The grafted polyvinyl alcohol polymer according to any preceding or following embodiment/feature/aspect, wherein one or more of said side chains from the plurality of side chains comprise the aliphatic amide, or the branched alkyl acrylate, or any combinations thereof.

17. The grafted polyvinyl alcohol polymer according to any preceding or following embodiment/feature/aspect, wherein the polyvinyl alcohol main chain, in unreacted form, has a monomodal molecular weight distribution of from about 5K to 20000K Daltons.

18. The grafted polyvinyl alcohol polymer according to any preceding or following embodiment/feature/aspect, wherein the polyvinyl alcohol main chain, in unreacted form, has a degree of hydrolysis of from about 74 mol % to about 99 mol %.

19. The grafted polyvinyl alcohol polymer according to any preceding or following embodiment/feature/aspect, wherein the polyvinyl alcohol main chain, in unreacted form, has a degree of hydrolysis of from about 74 mol % to about 90 mol %.

20. The grafted polyvinyl alcohol polymer according to any preceding or following embodiment/feature/aspect, wherein one or more of said side chains from the plurality of side chains are grafted to the polyvinyl alcohol main chain through acetate moieties of the polyvinyl alcohol main chain.

21. The grafted polyvinyl alcohol polymer according to any preceding or following embodiment/feature/aspect, wherein one or more of said side chains from the plurality of side chains are grafted to the polyvinyl alcohol main chain through hydroxyl moieties of the polyvinyl alcohol main chain.

22. The grafted polyvinyl alcohol polymer according to any preceding or following embodiment/feature/aspect, wherein the reactive quaternary ammonium salt comprises at least one of diallyl dimethyl ammonium chloride, 3-acrylamido propyl trimethyl ammonium chloride or combination of thereof;

wherein the aliphatic amide comprises at least one of acrylamide, methacrylamide, dimethyl acrylamide, diethyl acrylamide, dipropyl acrylamide and N-t-butylacrylamide; and wherein the branched alkyl acrylate comprises at least one of 2-ethylheptyl acrylate, 2-ethylhexylacrylate, 2-ethylpentyl acrylate and 2-ethylbutyl acrylate.

23. The grafted polyvinyl alcohol polymer according to any preceding or following embodiment/feature/aspect, which includes structure (I):

$$[CH_2-CH(OH)]_a-[CH_2-CH(R)]_b \quad (I)$$

wherein a total weight percent of (a) units is from 74% to 84% based on the total weight of the grafted polyvinyl alcohol polymer, wherein a total weight percent of (b) units is from 16% to 26% based on the total weight of the grafted polyvinyl alcohol polymer, wherein each R is acetate or a side chain from the plurality of side chains.

24. The grafted polyvinyl alcohol polymer according to any preceding or following embodiment/feature/aspect, comprising:

a polyvinyl alcohol main chain weight percent of about 40% to about 50%, by total solid weight;

a reactive quaternary ammonium salt side chain weight percent of about 6% to about 10% by total solid weight;

an aliphatic amide weight percent from about 6% to about 9% by total solid weight; and a branched alkyl acrylate weight percent from about 24% to about 50% by total solid weight.

25. The grafted polyvinyl alcohol polymer according to any preceding or following embodiment/feature/aspect, which has or comprises structure (IV):

wherein the total weight percent of a is 30% to 34% based on the total weight of the grafted polyvinyl alcohol polymer, the total weight percent of b is 6% to 10% based on the total weight of the grafted polyvinyl alcohol polymer, the total weight percent of c is 0.5% to 1.0% based on the total weight of the grafted polyvinyl alcohol polymer, the total weight percent of d is 58% to 62% based on the total weight of the grafted polyvinyl alcohol polymer.

26. The grafted polyvinyl alcohol polymer according to any preceding or following embodiment/feature/aspect, having a solid content of at least 25% solids.

27. The grafted polyvinyl alcohol polymer according to any preceding or following embodiment/feature/aspect in the form of dry solid particulate.

28. A polymer composition comprising:
the grafted polyvinyl alcohol polymer according to any preceding or following embodiment/feature/aspect; and an aqueous medium in which the grafted polyvinyl alcohol polymer is dispersed.

29. The polymer composition according to any preceding or following embodiment/feature/aspect, which has a pH of from about 3 to about 6.

30. An aqueous based graft emulsion polymer, comprising the grafted polyvinyl alcohol polymer according to any preceding or following embodiment/feature/aspect.

31. A cellulosic pulp product comprising:
cellulosic pulp; and
the grafted polyvinyl alcohol polymer according to any preceding or following embodiment/feature/aspect.

32. A paper product comprising:
a paper material; and
the grafted polyvinyl alcohol polymer according to any preceding or following embodiment/feature/aspect.

33. The paper product according to any preceding or following embodiment/feature/aspect,
wherein the paper material comprises a cellulosic fiber comprising a carboxyl moiety,
wherein one or more of said side chains from the plurality of side chains comprise units of the reactive quaternary ammonium salt, and
wherein a unit of the units of the reactive quaternary ammonium salt comprises a cationic charge interacting electrostatically with the carboxyl moiety of the cellulosic fiber.

34. A product comprising at least one paper layer comprising the grafted polyvinyl alcohol polymer according to any preceding or following embodiment/feature/aspect, wherein the product is paper sheeting, paperboard, tissue paper, or wallboard.

35. The product according to any preceding or following embodiment/feature/aspect, wherein the paper layer comprises a cellulosic fiber comprising a carboxyl moiety,
wherein one or more of said side chains from the plurality of side chains comprise units of the reactive quaternary ammonium salt, and
wherein a unit of the units of the reactive quaternary ammonium salt comprises a cationic charge interacting electrostatically with the carboxyl moiety of the cellulosic fiber.

36. A fibrous material comprising:
cotton fibers; and
the grafted polyvinyl alcohol polymer according to any preceding or following embodiment/feature/aspect.

37. The fibrous material according to any preceding or following embodiment/feature/aspect, wherein the cotton fibers are coated with the grafted polyvinyl alcohol polymer.

38. The fibrous material according to any preceding or following embodiment/feature/aspect, wherein the cotton fibers are impregnated with the grafted polyvinyl alcohol polymer.

39. The fibrous material according to any preceding or following embodiment/feature/aspect, wherein at least a portion of the cotton fibers comprise a cellulosic fiber comprising a carboxyl moiety,
wherein one or more of said side chains from the plurality of side chains comprise units of the reactive quaternary ammonium salt, and
wherein a unit of the units of the reactive quaternary ammonium salt comprises a cationic charge interacting electrostatically with the carboxyl moiety of the cellulosic fiber.

40. A process of making paper, the process comprising:
    absorbing an amount of the grafted polyvinyl alcohol polymer according to any preceding or following embodiment/feature/aspect on cellulosic papermaking fibers in aqueous suspension;
    forming said suspension into a web; and
    drying said web,
    wherein the amount of the grafted polyvinyl alcohol polymer is effective to increase at least one of paper wet strength, paper dry strength and water dispersibility as compared to a paper made with the aqueous suspension absent the grafted polyvinyl alcohol polymer.

41. The process according to any preceding or following embodiment/feature/aspect, wherein the aqueous suspension comprises 4 to 10 pounds grafted polyvinyl alcohol polymer per ton of dry cellulose papermaking fiber.

42. The process according to any preceding or following embodiment/feature/aspect, wherein the amount of the grafted polyvinyl alcohol polymer is effective to increase at least one of paper property selected from paper wet strength and paper dry strength by at least 10% as compared to the paper made with the aqueous suspension absent the grafted polyvinyl alcohol polymer.

43. The process according to any preceding or following embodiment/feature/aspect, wherein the amount of the grafted polyvinyl alcohol polymer is effective to provide a ratio of paper wet strength to paper dry strength of 0.6, wherein the wet strength value is determined by Finch Cup and Humidity Chamber methods and the dry strength value is determined by direct tensile strength measurement of dried and conditioned paper.

44. The process according to any preceding or following embodiment/feature/aspect,
    wherein absorbing the amount of the grafted polyvinyl alcohol polymer on cellulose papermaking fibers in the aqueous suspension comprises:
    providing a pulp stock comprising the cellulose papermaking fibers; and
    adding the amount of grafted polyvinyl alcohol polymer to the pulp stock, and
    wherein, forming said suspension into the web comprises:
    draining the suspension after absorbing the amount grafted polyvinyl alcohol polymer; and
    forming the drained suspension into one of paper and paperboard.

45. A process for making a grafted polyvinyl alcohol polymer comprising:
    providing an aqueous solution of a polyvinyl alcohol polymer;
    adding, to the aqueous solution, at least one free-radical forming initiator and a plurality of side chain monomers, the plurality of side chain monomers comprising:
    (a) an aliphatic monocarboxylic acid, an aliphatic dicarboxylic acid, and a reactive quaternary ammonium salt, or any combination thereof;
    (b) optionally an aliphatic amide; and
    (c) optionally a branched alkyl acrylate.

46. The process according to any preceding or following embodiment/feature/aspect, further comprising:
    attaching at least a portion of the plurality of side chain monomers to a polyvinyl alcohol main chain in a a:b:c ratio range of from 3:1:5 to 2.5:1:4 on a weight basis and normalized to an amount of (b) aliphatic amide.

47. A process for re-pulping paper, the process comprising:
    contacting a paper product with an alkali metal ion-containing caustic aqueous solution to convert carboxylic functionalities in the grafted polyvinyl alcohol polymer according to any preceding or following embodiment/feature/aspect to alkali metal carboxylate functionalities,
    wherein the paper product comprises: a paper material; and the grafted polyvinyl alcohol polymer.

48. A polymer mixture, comprising:
    a first grafted polyvinyl alcohol polymer comprising a first polyvinyl alcohol main chain and a first plurality of side chains grafted to the first polyvinyl alcohol main chain, wherein side chains from the first plurality of side chains comprise: i) one or more units selected from: an aliphatic monocarboxylic acid, and an aliphatic dicarboxylic acid; and, optionally, ii) an aliphatic amide, or a branched alkyl acrylate, or any combinations thereof; and
    a second grafted polyvinyl alcohol polymer comprising a second polyvinyl alcohol main chain and a second plurality of side chains grafted to the second polyvinyl alcohol main chain, wherein side chains from the second plurality of side chains comprise: i) one or more units of a reactive quaternary ammonium salt; and, optionally, ii) an aliphatic amide, or a branched alkyl acrylate, or any combinations thereof.

49. The polymer mixture according to any preceding or following embodiment/feature/aspect, comprising the first grafted polyvinyl alcohol polymer and the second polyvinyl alcohol polymer in a first grafted polyvinyl alcohol polymer: second polyvinyl alcohol polymer weight ratio of from 10:1 to 1:10.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A grafted polyvinyl alcohol polymer comprising a polyvinyl alcohol main chain and a plurality of side chains grafted to the polyvinyl alcohol main chain,
    wherein one or more of said side chains from the plurality of side chains comprise: i) one or more units selected from: an aliphatic monocarboxylic acid, an aliphatic dicarboxylic acid, and a reactive quaternary ammonium salt; and, ii) units of a branched alkyl acrylate.

2. The grafted polyvinyl alcohol polymer according to claim 1, wherein at least 75%, by numerical number of said side chains from the plurality of side chains comprise: i) said one or more units selected from: the aliphatic monocarboxylic acid, the aliphatic dicarboxylic acid, and the reactive quaternary ammonium salt; and, ii) said units of the branched alkyl acrylate.

3. The grafted polyvinyl alcohol polymer according to claim 1, wherein not more than 25%, by numerical number of side chains, from the plurality of side chains comprise units of the aliphatic amide, or units of the branched alkyl acrylate, or any combinations thereof, and have no units of the aliphatic monocarboxylic acid, of the aliphatic dicarboxylic acid, and of the reactive quaternary ammonium salt.

4. The grafted polyvinyl alcohol polymer according to claim 1, wherein one or more of said side chains from the plurality of side chains further comprise units of an aliphatic amide.

5. The grafted polyvinyl alcohol polymer according to claim 1, wherein side chains from the plurality of side chains comprise: i) said units of the reactive quaternary ammonium salt.

6. The grafted polyvinyl alcohol polymer according to claim 5, wherein at least 75%, by numerical number of side chains, from the plurality of side chains comprise: i) said units of the reactive quaternary ammonium salt.

7. The grafted polyvinyl alcohol polymer according to claim 5, wherein one or more of said side chains from the plurality of side chains further comprise units of an aliphatic amide.

8. The grafted polyvinyl alcohol polymer according to claim 1, wherein side chains from the plurality of side chains comprise: i) said one or more units selected from: the aliphatic monocarboxylic acid and the aliphatic dicarboxylic acid.

9. The grafted polyvinyl alcohol polymer according to claim 1, wherein the polyvinyl alcohol main chain, in unreacted form, has a monomodal molecular weight distribution of from about 5K to 20000K Daltons.

10. The grafted polyvinyl alcohol polymer according to claim 1, wherein the polyvinyl alcohol main chain, in unreacted form, has a degree of hydrolysis of from about 74 mol % to about 99 mol %.

11. The grafted polyvinyl alcohol polymer according to claim 1, wherein the polyvinyl alcohol main chain, in unreacted form, has a degree of hydrolysis of from about 74 mol % to about 90 mol %.

12. The grafted polyvinyl alcohol polymer according to claim 1, wherein one or more of said side chains from the plurality of side chains are grafted to the polyvinyl alcohol main chain through acetate moieties of the polyvinyl alcohol main chain.

13. The grafted polyvinyl alcohol polymer according to claim 1, wherein one or more of said side chains from the plurality of side chains are grafted to the polyvinyl alcohol main chain through hydroxyl moieties of the polyvinyl alcohol main chain.

14. The grafted polyvinyl alcohol polymer according to claim 4,
wherein the reactive quaternary ammonium salt is at least one of diallyl dimethyl ammonium chloride, 3-acrylamido propyl trimethyl ammonium chloride or combination of thereof;
wherein the aliphatic amide comprises at least one of acrylamide, methacrylamide, dimethyl acrylamide, diethyl acrylamide, dipropyl acrylamide and N-t-butylacrylamide; and
wherein the branched alkyl acrylate comprises at least one of 2-ethylheptyl acrylate, 2-ethylhexylacrylate, 2-ethylpentyl acrylate and 2-ethylbutyl acrylate.

15. The grafted polyvinyl alcohol polymer according to claim 1, which is or comprises structure (I):

$$[CH_2—CH(OH)]_a—[CH_2—CH(R)]_b \quad (I)$$

wherein a total weight percent of (a) units is from 74% to 84% based on the total weight of the grafted polyvinyl alcohol polymer,
wherein a total weight percent of (b) units is from 16% to 26% based on the total weight of the grafted polyvinyl alcohol polymer,
wherein each R is acetate or a side chain from the plurality of side chains.

16. A grafted polyvinyl alcohol polymer comprising a polyvinyl alcohol main chain and a plurality of side chains grafted to the polyvinyl alcohol main chain,
wherein one or more of said side chains from the plurality of side chains comprise: a reactive quaternary ammonium salt, units of an aliphatic amide, and a branched alkyl acrylate, and said grafted polyvinyl alcohol polymer having
a polyvinyl alcohol main chain weight percent of about 40% to about 50%, by total solid weight;
a reactive quaternary ammonium salt side chain weight percent of about 6% to about 10% by total solid weight;
an aliphatic amide weight percent from about 6% to about 9% by total solid weight; and
a branched alkyl acrylate weight percent from about 24% to about 50% by total solid weight.

17. A grafted polyvinyl alcohol polymer which is or comprises structure

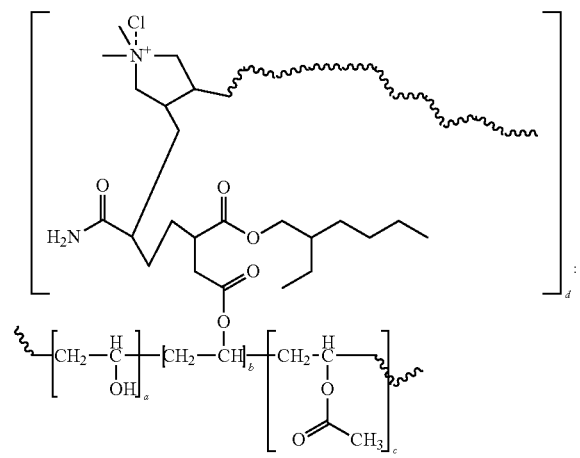

wherein the total weight percent of a is 30% to 34% based on the total weight of the grafted polyvinyl alcohol polymer, the total weight percent of b is 6% to 10% based on the total weight of the grafted polyvinyl alcohol polymer, the total weight percent of c is 0.5% to 1.0% based on the total weight of the grafted polyvinyl alcohol polymer, and the total weight percent of d is 58% to 62% based on the total weight of the grafted polyvinyl alcohol polymer.

18. The grafted polyvinyl alcohol polymer according to claim 1, having a solid content of at least 25% solids.

19. The grafted polyvinyl alcohol polymer according to claim 1 in the form of dry solid particulate.

20. A polymer composition comprising:
the grafted polyvinyl alcohol polymer according to claim 1; and
an aqueous medium in which the grafted polyvinyl alcohol polymer is dispersed, and wherein said polymer composition is an emulsion polymer composition.

21. The polymer composition according to claim 20, which has a pH of from about 3 to about 6.

22. An aqueous based graft emulsion polymer, comprising the grafted polyvinyl alcohol polymer according to claim 1.

23. The polymer composition of claim 20, wherein said branched alkyl acylate is present in said polymer composition in an amount of at least 24% by total solid weight.

24. The polymer composition of claim 20, wherein said branched alkyl acylate is present in said polymer composition in an amount of at least 50% by total solid weight.

25. The polymer composition of claim 20, wherein said one or more of said side chains from the plurality of side chains comprise one or more units of said aliphatic monocarboxylic acid, said aliphatic dicarboxylic acid, and said reactive quaternary ammonium salt.

26. The polymer composition of claim 20, wherein said one or more of said side chains from the plurality of side chains comprise one or more units of said aliphatic monocarboxylic acid, said aliphatic dicarboxylic acid, and said reactive quaternary ammonium salt, and further comprise units of an aliphatic amide.

27. The polymer composition of claim 20, wherein said one or more of said side chains from the plurality of side chains comprise one or more units of said aliphatic monocarboxylic acid, said aliphatic dicarboxylic acid, and further comprise units of an aliphatic amide.

28. The grafted polyvinyl alcohol polymer according to claim 1, wherein said branched alkyl acrylate is present in said polymer composition in an amount of at least 24% by total solid weight.

29. The grafted polyvinyl alcohol polymer according to claim 1, wherein said branched alkyl acrylate is present in said polymer composition in an amount of at least 50% by total solid weight.

30. The grafted polyvinyl alcohol polymer according to claim 28, wherein said branched alkyl acrylate is 2-ethylhexylacrylate.

* * * * *